United States Patent
Erkip et al.

(10) Patent No.: US 8,611,271 B2
(45) Date of Patent: Dec. 17, 2013

(54) ROBUST COOPERATIVE RELAYING IN A WIRELESS LAN: CROSS-LAYER DESIGN

(75) Inventors: Elza Erkip, New York, NY (US); Pei Liu, Forest Hills, NY (US); Chun Nie, Nutley, NJ (US); Shivendra S. Panwar, Freehold, NJ (US)

(73) Assignee: Polytechnic Institute of New York University, Brooklyn, NY (US)

( * ) Notice: Subject to any disclaimer, the term of this patent is extended or adjusted under 35 U.S.C. 154(b) by 339 days.

(21) Appl. No.: 12/938,101

(22) Filed: Nov. 2, 2010

(65) Prior Publication Data

US 2011/0110290 A1    May 12, 2011

Related U.S. Application Data

(60) Provisional application No. 61/257,123, filed on Nov. 2, 2009.

(51) Int. Cl.
*H03C 7/00* (2006.01)

(52) U.S. Cl.
USPC .......................................... 370/315; 370/310

(58) Field of Classification Search
USPC ........................................................ 370/315
See application file for complete search history.

(56) References Cited

U.S. PATENT DOCUMENTS

| | | | |
|---|---|---|---|
| 2006/0077942 A1* | 4/2006 | Panwar et al. | 370/338 |
| 2008/0137585 A1* | 6/2008 | Loyola et al. | 370/315 |
| 2008/0310348 A1* | 12/2008 | Nandagopalan et al. | 370/328 |

* cited by examiner

*Primary Examiner* — Huy D Vu
*Assistant Examiner* — Kevin Cunningham
(74) *Attorney, Agent, or Firm* — Straub & Pokotylo; John C. Pokotylo

(57) ABSTRACT

A distributed and opportunistic medium access control (MAC) layer protocol for randomized distributed space-time coding (R-DSTC), which may be deployed in an IEEE 802.11 wireless local area network (WLAN), is described. Unlike other cooperative MAC designs, there is no need to predetermine, before packet transmission, which stations will serve as relays. Instead, the MAC layer protocol opportunistically recruits relay stations on the fly. Network capacity and delay performance is much better than legacy IEEE 802.11g network, and even cooperative forwarding using one relay station. Avoiding the need to collect the station-to-station channel statistics considerably reduces overhead otherwise required for channel measurement and signaling.

19 Claims, 16 Drawing Sheets

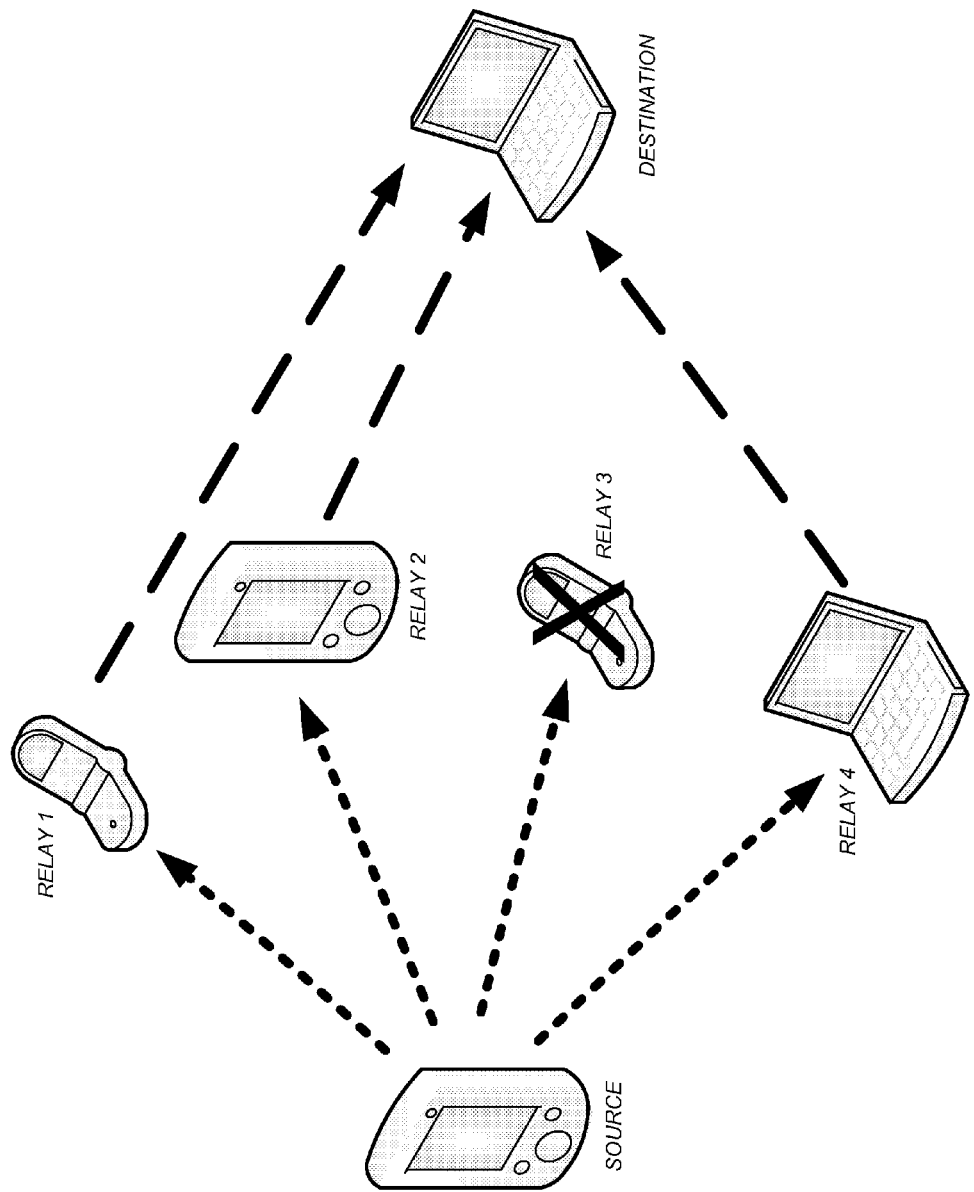

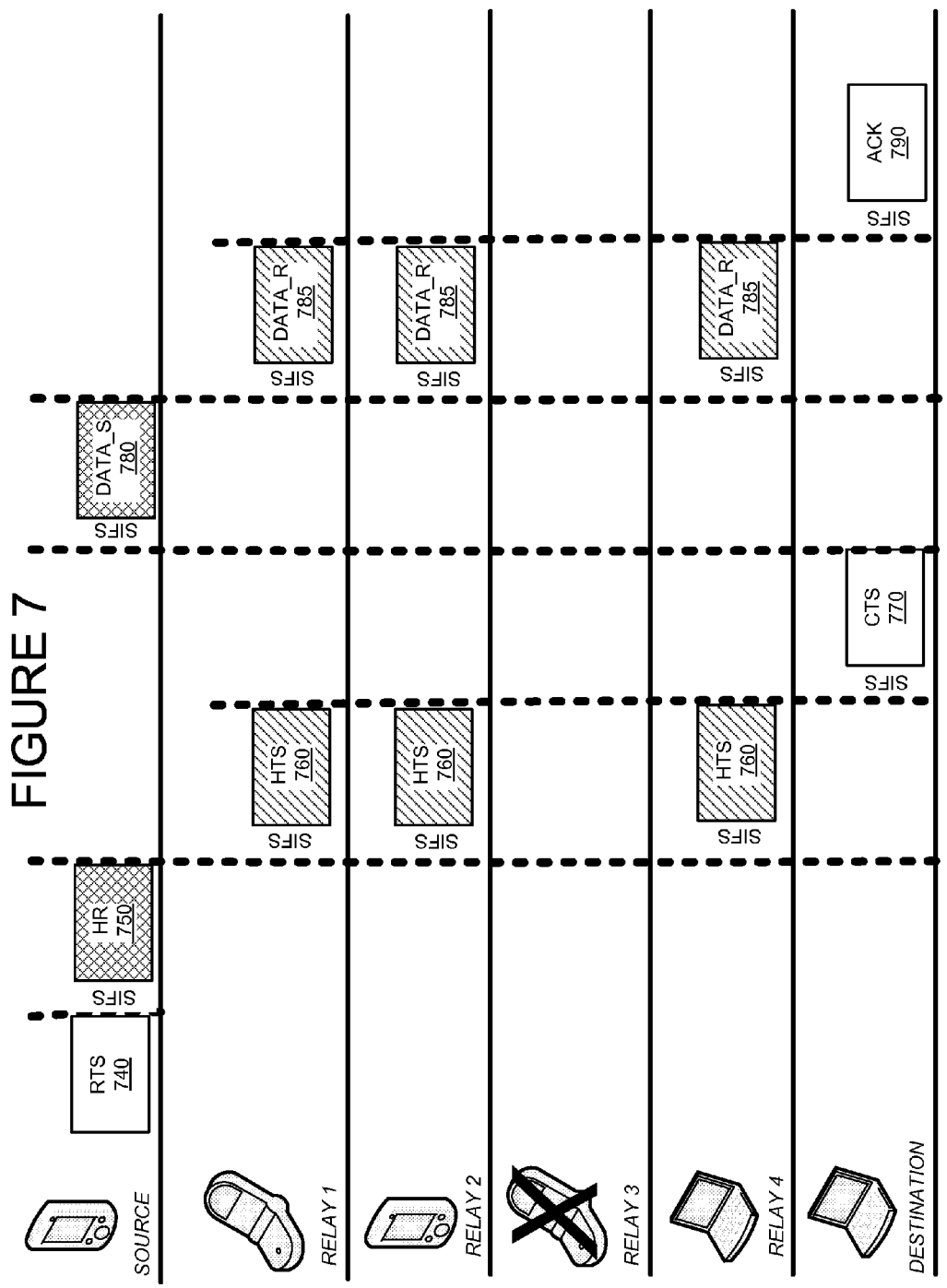

TABLE 1: Notation Used in the Paper

| Notation | Description |
|---|---|
| $N$ | Number of stations in a WLAN excluding the AP |
| $r_1, r_2$ | The first and second hop rates |
| $L$ | STC dimension for the underlying space-time code |
| $\tau$ | End-to-end PER threshold |
| $M_r, C_r$ | Modulation, channel coding for rate $r$ |
| $E_s$ | Symbol energy |
| $N_0/2$ | Power spectral density of AWGN |
| $h_{ij}$ | Instantaneous channel gain between stations $i$ and $j$ |
| $\mathbf{h}^{(1)}$ | Instantaneous channel gain vector between source and relays |
| $\mathbf{h}^{(2)}$ | Instantaneous channel gain vector between relays and destination |
| $RS_s$ | Deterministic relay set of source station $s$ for DSTC |
| $RS$ | Instantaneous relay set of source station $i$ for R-DSTC |
| $P_b^d(r, h_{sd})$ | BER for a direct connection between stations $i$ and $j$ for given $r$ and $h_{sd}$ |
| $P_p^d(r, h_{sd})$ | PER for a direct connection between stations $i$ and $j$ for given $r$ and $h_{sd}$ |
| $P_b^{R\text{-}DSTC}(r, L, \mathbf{h}^{(2)}, R)$ | BER for R-DSTC between relays and destination for given $r$, $L$, $\mathbf{h}^{(2)}$ and $R$ |
| $P_p^{R\text{-}DSTC}(r, L, \mathbf{h}^{(2)}, R)$ | PER for R-DSTC between relays and destination for given $r$, $L$, $\mathbf{h}^{(2)}$ and $R$ |
| $P_b^{DSTC}(r, L, \mathbf{h}^{(2)})$ | BER for DSTC between relays and destination for given $r$, $L$, and $\mathbf{h}^{(2)}$ |
| $P_p^{DSTC}(r, L, \mathbf{h}^{(2)})$ | PER for DSTC between relays and destination for given $r$, $L$, and $\mathbf{h}^{(2)}$ |
| $P_p^{direct}(r, h_{sd})$ | End-to-end PER for a direct transmission for given $r$ and $h_{sd}$ |
| $P_p^{DSTC}(r_1, r_2, L, RS_s, \mathbf{h}^{(1)}, \mathbf{h}^{(2)})$ | End-to-end PER for DSTC for given $r_1, r_2, L, RS_s, \mathbf{h}^{(1)}, \mathbf{h}^{(2)}$ |
| $P_p^{R\text{-}DSTC}(r_1, r_2, L, \mathbf{h}^{(1)}, \mathbf{h}^{(2)}, R)$ | End-to-end PER for R-DSTC for given $r_1, r_2, L, \mathbf{h}^{(1)}, \mathbf{h}^{(2)}$ and $R$ |
| $\bar{P}_p^d(r)$ | Average end-to-end PER for a direct transmission for given $r$ |
| $\bar{P}_p^{coop}(r_1, r_2, j)$ | Average end-to-end PER for CoopMAC for given $r_1, r_2$ and relay $j$ |
| $\bar{P}_p^{R\text{-}DSTC}(r_1, r_2, L)$ | Average end-to-end PER for R-DSTC for given $r_1, r_2$ and $L$ |
| $\bar{P}_p^{DSTC}(r_1, r_2, L, RS_s)$ | Average end-to-end PER for DSTC for given $r_1, r_2, L$ and $RS_s$ |

FIGURE 8

TABLE II: Simulation Configuration and Mobility Modeling

| Parameters | Value |
|---|---|
| Received $E_s/N_0$ at edge | 1.4 |
| Path loss exponent | 3.0 |
| Propagation Model | ITU-T Indoor Model and Rayleigh fading |
| Spectrum bandwidth | 20 MHz |
| PHY layer data rates, $r$ | 6, 9, 12, 18, 24, 36, 48, 54 Mbps |
| Modulation, $M_r$ | BPSK, QPSK, 16-QAM, 64-QAM |
| Channel coding, $C_r$ | Convolutional 1/2, 2/3, 3/4 [19] |
| Acceptable MAC Layer PER $\gamma$ | 5% |
| MAC Layer PDU size | 1500 bytes |
| Contention window size | 0 - 1023 |
| Underlying orthogonal STC dimension, $L$ | 2, 3, 4 |
| Achievable STC code rates, $R_c$ | 1 ($L=2$), 3/4 ($L=3,4$) |
| Min Speed ($V_{min}$) | 1 meter/second |
| Max Speed ($V_{max}$) | 2 meter/second |
| Dwell Time during Walk ($T_d$) | 1 second |
| Min Travel Duration per Step ($T_{min}$) | 2 second |
| Max Travel Duration per Step ($T_{max}$) | 5 second |

FIGURE 9

Algorithm 1 Rate Adaptation for STiCMAC Channel Statistics

1: Assume that the available rate set for both the first hop ($r_1$) and the second hop ($r_2$), where $r_1, r_2 \in \{R_1, R_2, ..., R_P\}$, and the set of available orthogonal STC dimensions for R-DSTC is $L$, where $L \in \{L_1, L_2, ..., L_{max}\}$. Initialize $R^* = 0$
2: for Each possible set of transmission parameters $\{r_1, r_2, L\}$ do
3:    Find $P_p^{R-DSTC}(r_1, r_2, L)$ for R-DSTC using Eq.(8).
4:    if $P_p^{R-DSTC}(r_1, r_2, L) < \gamma$ and $\frac{1}{1/r_1 + 1/r_2} > R^*$ then
5:       $R^* \leftarrow \frac{1}{1/r_1 + 1/r_2}, L^* \leftarrow L, r_1^* \leftarrow r_1, r_2^* \leftarrow r_2$
6:    end if
7: end for

---

Algorithm 2 Rate Adaptation for STiCMAC User Count

1: Assume that the available rate set for both the first hop ($r_1$) and the second hop ($r_2$), where $r_1, r_2 \in \{R_1, R_2, ..., R_P\}$, and the set of available orthogonal STC dimensions for R-DSTC is $L$, where $L \in \{L_1, L_2, ..., L_{max}\}$. Suppose all stations are located in the WLAN cell based on a random distribution function $\chi$. Initialize $R^* = 0$
2: for Each possible set of transmission parameters $\{r_1, r_2, L\}$ do
3:    for All possible locations of other stations do
4:       Find $P_p^{R-DSTC}(r_1, r_2, L)$ for R-DSTC transmission using Eq. (8) and average over all these locations using $\chi$. Make sure the average PER $\mathbb{E}_\chi(P_p^{R-DSTC}(r_1, r_2, L))$ over $\chi$ is below $\gamma$.
5:    end for
6:    if $\mathbb{E}_\chi(P_p^{R-DSTC}(r_1, r_2, L)) < \gamma$ and $\frac{1}{1/r_1 + 1/r_2} > R^*$ then
7:       $R^* \leftarrow \frac{1}{1/r_1 + 1/r_2}, L^* \leftarrow L, r_1^* \leftarrow r_1, r_2^* \leftarrow r_2$
8:    end if
9: end for

FIGURE 10

ROBUST COOPERATIVE RELAYING IN A WIRELESS LAN: CROSS-LAYER DESIGN

§0. RELATED APPLICATIONS

Benefit is claimed to the filing date of U.S. Provisional Patent Application Ser. No. 61/257,123 ("the '123 provisional"), titled "Robust Cooperative Relaying in a Wireless LAN: Cross-layer Design and Performance Analysis," filed on Nov. 2, 2009 and listing Elza ERKIP, Pei LIU, Chun NIE and Shivendra S. PANWAR as inventors. The '123 provisional is incorporated herein by reference. However, the scope of the claimed invention is not limited by any requirements of any specific embodiments described in the '123 provisional.

§1. BACKGROUND OF THE INVENTION

§1.1 Field of the Invention

The present invention concerns data communications. In particular, the present invention concerns cooperative relaying of information in a wireless local area network (LAN).

§1.2 Background Information

In the past decades, WiFi has become one of the most popular wireless technologies due to its low cost, simple installation and great capability to support high speed data communications. The IEEE 802.11 (See, e.g. "Part 11: Wireless LAN Medium Access Control (MAC) and Physical Layer (PHY) Specifications," *ANSI/IEEE Std* 802.11, 1999 *Edition*, 1999, incorporated herein by reference.) standard has established itself as the most prevalent wireless LANs (WLAN) protocol and includes several versions, such as IEEE 802.11a/b/g/n.

While a conventional WiFi system can support a relatively high data transmission speed (e.g., up to 54 Mbps for IEEE.802.11a/g), the aggregated throughput of a WLAN cell may be severely degraded by slow stations located close to the edge of the cell. (See, e.g., M. Heusse, F. Rousseau, G. Berger-Sabbatel, and A. Duda, "Performance Anomaly of 802.11b," *Proc., IEEE INFOCOM*, San Francisco, Calif., April 2003, incorporated herein by reference.) In recent years, the concept of cooperative wireless communication has attracted significant research attention in the physical or layer 1(PHY) layer. (See, e.g. A. Sendonaris, E. Erkip, and B. Aazhang, "User Cooperation Diversity—Part I: System Description," *IEEE Transactions on Communications*, Vol. 51, No. 11, pp. 1927-1938 (November 2003); and "User Cooperation Diversity—Part II: Implementation Aspects and Performance Analysis," *IEEE Transactions on Communications*, Vol. 51, No. 11, pp. 1939-1948 (November 2003), both incorporated herein by reference.) As one of the MAC layer designs to support a cooperative PHY layer in a WLAN, "CoopMAC" enhances the system throughput by using a two hop transmission, where transmission between a source and a destination occurs via an intermediate station, called a "relay station" or simply a "relay". (See, e.g. P. Liu, Z. Tao, S. Narayanan, T. Korakis, and S. Panwar, "CoopMAC: A Cooperative MAC for Wireless LANs," *IEEE Journal on Sel. Area in Communications*, Vol. 25, No. 2, pp. 340-354 (February 2007); and P. Liu, Z. Tao, Z. Lin, E. Erkip, and S. Panwar, "Cooperative Wireless Communications: A Cross-Layer Approach," *IEEE Communications Magazine, Special Issue on MIMO Systems*, (August 2006), both incorporated herein by reference.) The performance of "CoopMAC," albeit superior to direct communication, is still limited as it only selects a single relay.

To improve a single relay system, multiple relays can be employed at the PHY layer to collaboratively transmit the source signal to the destination, thereby improving diversity gain. Distributed spacetime coding (DSTC) across the relay stations achieves a high spatial diversity while maintaining spectral efficiency. A cooperative MAC layer incorporating DSTC is expected to improve performance over CoopMAC. Unfortunately, however, it still has inherent drawbacks that lead to difficulties and inefficiencies at the MAC layer. Such drawbacks may include, for example, (1) the need to recruit and index relay nodes ahead of time and its associated overhead, (2) the need to estimate accurate channel information for all possible relays and its associated overhead, (3) the need for global information at the source to optimize performance, (4) vulnerability to random loss at the first hop, and (5) the loss of potential diversity and performance gain by unselected relays.

A detailed distributed MAC layer protocol that deploys DSTC in a cooperative ad hoc network is described, for example, in the article G. Jakllari, S. V. Krishnamurthy, M. Faloutsos, P. V. Krishnamurthy, and O. Ercetin, "A Framework for Distributed Spatio-Temporal Communications in Mobile Ad hoc Networks," *Proc., IEEE INFOCOM* (Barcelona, Spain, April 2006) (incorporated herein by reference). However, in the Jakllari et al protocol, the source station must (1) discover a set of selected relays and (2) assign the antenna array index to each relay for the underlying DSTC by the use of a broadcast message. Further, each chosen relay, upon receiving that message, must respond with a pilot tone to verify its availability as a relay. This process consumes significant signaling overhead which could be very costly in a mobile environment. Further, under the Jakllari et al protocol, whenever any selected relay fails to receive from the source, DSTC cannot be established and the transmission falls back to direct transmission from the source to the destination. Thus the system robustness to the channel fading and mobility effects is limited. Furthermore, under the Jakllari et al protocol, the source station does not allow stations, other than the chosen set of relays, to cooperate even if those stations may successfully decode the source signal. This sacrifices the potential for additional diversity gains.

The above problems can be addressed by randomized distributed space-time coding (R-DSTC) (See, e.g., B. S. Mergen and A. Scaglione, "Randomized space-time coding for distributed cooperative communication," *IEEE Transactions on Signal Processing*, pp. 5003-5017 (October 2007), incorporated herein by reference.), which reduces the requirements for coordination among the source station and the relays. R-DSTC provides robust cooperative relaying of the source signal. More specifically, in contrast to a regular DSTC, R-DSTC does not allocate the antenna array index to each relay. This simplifies the protocol design and reduces signaling costs. A generic cooperative MAC layer protocol is presented in the article P. Liu, Y. Liu, T. Korakis, A. Scaglione, E. Erkip, and S. Panwar, "Cooperative MAC for Rate Adaptive randomized Distributed Space-Time Coding," *Proc., IEEE Globecom (November* 2008), and described in U.S. Patent Application Publication No. 2010/0014453 (both incorporated herein by reference), which shows that the throughput gain of R-DSTC over conventional single-hop and two-hop single-relay (e.g. CoopMAC) approaches. However, the Liu et al article does not present a detailed MAC layer design (e.g., for on-the-fly recruitment of relay nodes) and does not describe details of error correction coding and channel coding. Furthermore, for simplicity, channel coding and forward error correction are ignored. Further, in the system described in the Liu article, the transmission rates for the first hop and second hop are picked independently, where each hop rate is based on a packet error rate (PER) threshold. Consequently, there is no guaranteed end-to-end PER for the packet received.

Thus, it would be useful to improve R-DSTC, such as by providing an improved MAC layer design. It would be useful if such a MAC layer design could guarantee end-to-end PER. It would be useful if such a MAC layer design allowed the selection of a transmission rate that meets one or more policy goals.

§2. SUMMARY OF THE INVENTION

Exemplary embodiments consistent with the present invention provide a simple, yet robust, IEEE 802.11 compliant cooperative PHY-MAC cross-layer framework based on R-DSTC, that exploits the opportunistic diversity gain of multiple relays. More specifically, such embodiments may facilitate the cooperative communication of data from a source node to a destination node via a plurality of relay nodes, by: (a) transmitting, with the source node, a ready to send message; (b) transmitting, with the source node, a helper recruiter message; (c) responsive to the receipt and successful decoding of the helper recruiter message by at least some of the plurality of relay nodes, transmitting, with the at least some of the plurality of relay nodes, a helper ready to send message; (d) responsive to the receipt and successful decoding of the helper ready to send message, transmitting, with the destination node, a clear to send message; (e) responsive to the receipt and successful decoding of the clear to send message, transmitting, with the source node, data for receipt by the at least some of the plurality of relay nodes; (f) responsive to the receipt of the data by the at least some of the plurality of relay nodes, retransmitting the data for receipt by the destination node.

In at least some embodiments consistent with the present invention, the ready to send message, the clear to send message, or both, are compliant with IEEE 802.11.

In at least some embodiments consistent with the present invention, the helper recruiter message includes a MAC address of the source node and a MAC address of the destination node. Alternatively or in addition, it may include parameters to be used for the retransmission of data from the at least some of the plurality of relay nodes to the destination node.

In at least some embodiments consistent with the present invention, the helper recruiter message and the data transmissions by the source node occur at a first hop rate, while the helper to send message and the data retransmissions by the at least some of the plurality of relay nodes occur at a second hop rate.

§3. BRIEF DESCRIPTION OF THE DRAWINGS

FIGS. 6 and 7 illustrate a simple example of communications between a source node, relays nodes and a destination node under an exemplary protocol consistent with the present invention.

FIG. 8 is a table of notation used in this application.

FIG. 9 is a table of parameters used in a simulation evaluating the performance of an exemplary protocol consistent with the present invention.

FIG. 10 illustrates pseudo code for two rate adaptation techniques consistent with the present invention.

§4. DETAILED DESCRIPTION

The present invention may involve novel methods, apparatus, message formats, and/or data structures for transmitting information from a source node to a destination node via multiple relay nodes using R-DSTC. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

Figure 1:
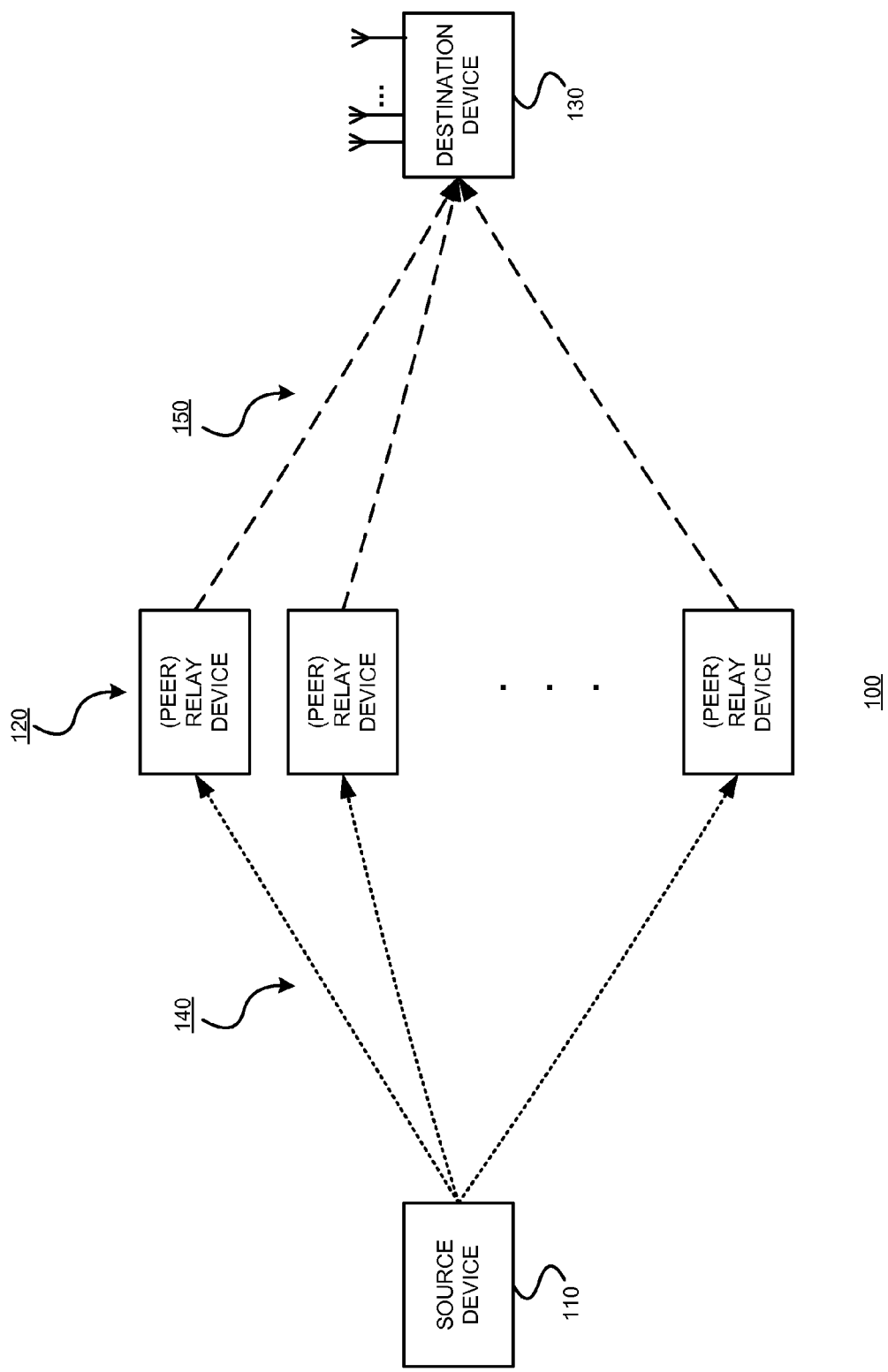
FIG. 1 illustrates an exemplary environment 100 in which embodiments consistent with the present invention may operate.

§4.1 Exemplary Environment in Which Embodiments Consistent with the Present Invention May Operate FIG. 1 illustrates an exemplary environment 100 in which embodiments consistent with the present invention may operate. As shown, the environment 100 includes a source device 110, a plurality of relay devices 120 and a destination device 130. The source device 110 include may include one antenna, or a plurality of (T) antennas. Assume that the destination device 130 includes a plurality of (L) antennas. There are a total of N source, relay and destination devices in the network. Embodiments consistent with the present invention are useful when T<L—that is, when the destination device 130 has more antennas than the source device 110 has.

As shown by lines 140, to maximize spatial multiplexing gain, the source device 110 first broadcasts a data packet (or an "information stream", which is to be interpreted broadly to include a single packet, or a sequence of packets) for receipt by each relay 120. (Note that if the source device has more than one antenna (that is, a plurality of (T) antennas), then multiple streams may be transmitted, and/or multiple instances of the same stream may be transmitted. However, to simplify the description, embodiments consistent with the present invention will be described with reference to a single information stream.) Then, as shown by lines 150, each of the relay devices 120 transmits, using randomized cooperation (in synchronization and in parallel with the other relay devices), to the destination device 130, thereby achieving a high spatial multiplexing gain.

Thus, transmissions from a source to a destination take two-hops. The source first broadcast the packet to the network, and potential relays that receive the correct packet forward jointly, using randomized cooperation.

In embodiments consistent with the present invention, there is no need to determine which nodes will act as relays before the start of transmission. Instead, relays are recruited on-the-fly (i.e., any node that receives a packet correctly from the source can forward to the destination, no matter where they are), thus making the system very robust to random loss and interference.

Embodiments consistent with the present invention may be backward compatible with IEEE 802.11 systems. In contrast to previous papers (See, e.g. P. Liu, Z. Tao, S. Narayanan, T. Korakis, and S. Panwar, "CoopMAC: A Cooperative MAC for Wireless LANs," *IEEE Journal on Sel. Area in Communications*, Vol. 25, No. 2, pp. 340-354 (February 2007); and P. Liu, Y. Liu, T. Korakis, A. Scaglione, E. Erkip, and S. Panwar, "Cooperative MAC for Rate Adaptive Randomized Distributed Space-Time Coding," *Proc., IEEE Globecom* (November 2008), both incorporated herein by reference.) that determine the transmission rates using per hop packet error probability, embodiments consistent with the present invention may perform rate adaptation by jointly optimizing the two-hop transmissions, and may guarantee that the end-to-end PER at MAC layer is below a certain threshold. Furthermore, embodiments consistent with the present invention enable fully distributed cooperation. Consequently, even stations far away from the source can participate as relays.

§4.2 Exemplary Apparatus

Figure 2:
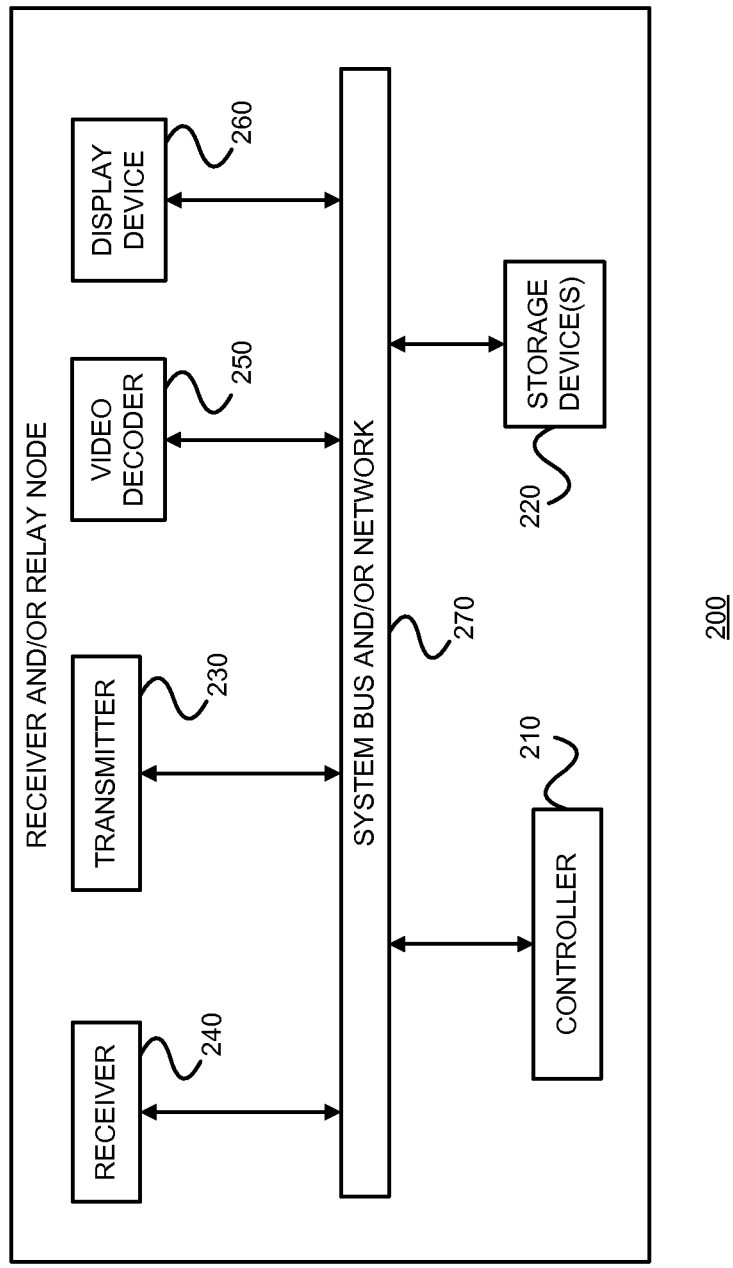
FIG. 2 is a block diagram of exemplary receiver or relay node 200 consistent with the present invention.

FIG. 2 is a block diagram of exemplary receiver or relay node 200 consistent with the present invention. As shown, the node 200 may include a controller 210, one or more storage devices 220, a transmitter 230, a receiver 240, a video decoder 250, a display device 260 and a system bus(es) and/or network(s) 270. The various components 210-260 may communicate with each other via the system bus(es) and/or network(s) 270.

The controller 210 may include a microprocessor, an ASIC, an FPGA, etc., and may control and coordinate operations of the other components 220-260 of the node 200. The storage device(s) 220 may provide volatile and non-volatile storage of information, and/or program instructions.

The transmitter 230 may operate to relay at least a part of received video information to one or more other receiver nodes.

The receiver 240 may operate to receive one or more layers of video information (to be transmitted, to be decoded and viewed, or both). Video decoder 250 may decode received video information to be rendered on the node 200. The decoded video may then be rendered on a display device 260. (Audio portions of a video stream may be decoded and rendered on a speaker (not shown).)

Figure 3:
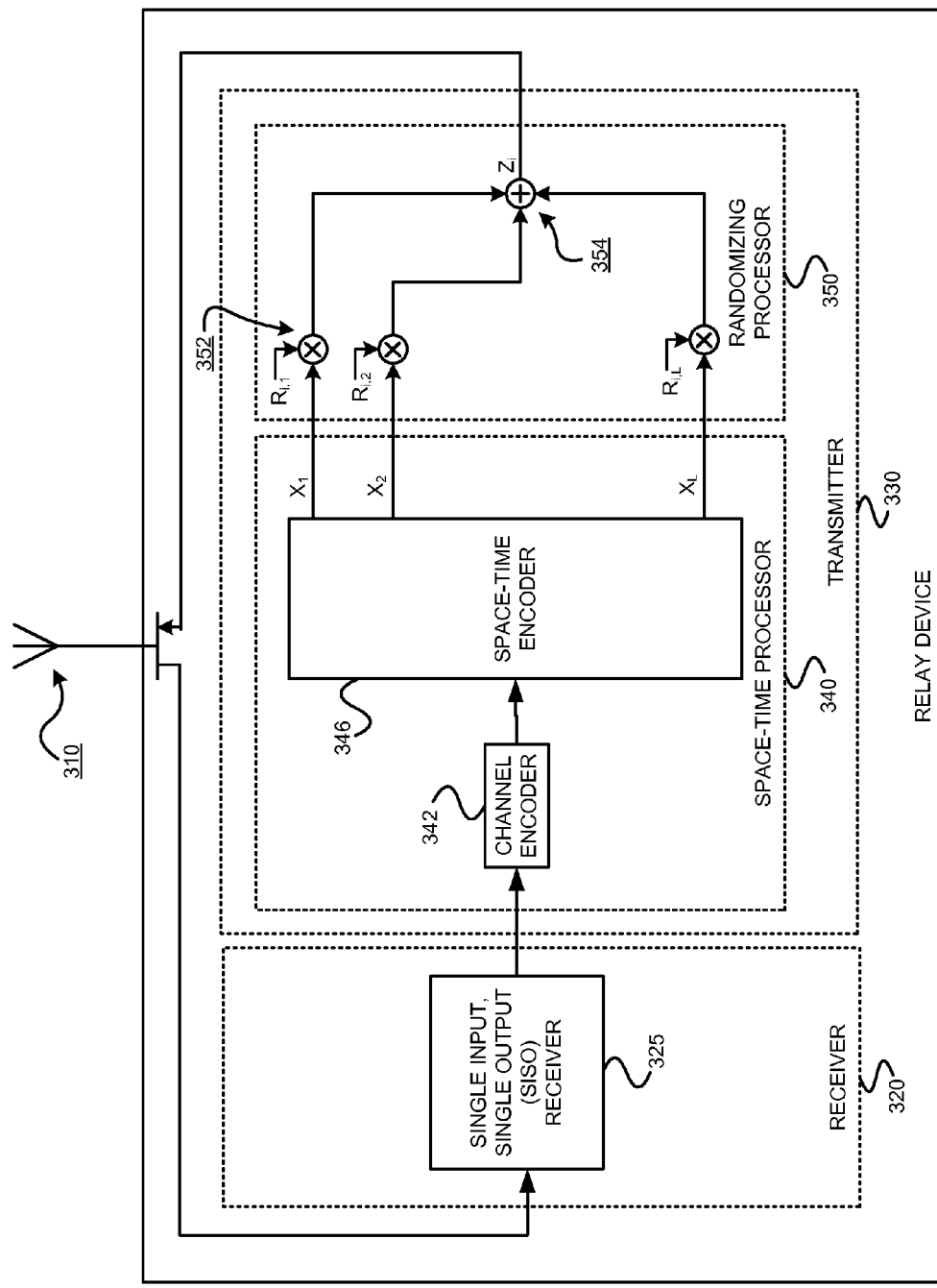
FIG. 3 is a block diagram illustrating an architecture of an exemplary relay device 300 consistent with the present invention.

FIG. 3 is a block diagram illustrating an architecture of an exemplary relay device 300 consistent with the present invention. The exemplary relay device 300 may include a transmit/receive antenna 310, a receiver portion 320 and a transmitter portion 330.

The receiver portion 320 includes a single-input-single-output ("SISO") receiver 325 which accepts a signal received by antenna 310 (from source device), and which outputs a serial signal to the transmitter 330.

The transmitter portion 330 includes a space-time processor 340 followed by a randomizing processor 350. The use of the randomizing processor 350 in the context illustrated is new and advantageous.

The space-time processor 340 includes a a channel encoder 342 and a space-time encoder 346.

The relay device 300 then re-encodes the information bits and passes them to a space-time code (STC) encoder. Assume the underlying space-time codeword G is of dimension L×K; where L is the number of antennas and K is the block length transmitted by each antenna. Hence, the output from the STC encoder is in the form of L parallel streams, $X_1, X_2, \ldots X_L$, each stream corresponding to an antenna. In a standard MIMO system, the $i^{th}$ antenna would transmit stream $X_i$ of K symbols. In contrast, in a R-DSTC system, each relay transmits a linear weighted combination of all L streams. Each weight is an independently generated random variable with zero mean and variance I/L.

At least some embodiments consistent with the present invention may be implemented in hardware (e.g., integrated circuits, application specific integrated circuits, programmable logic or gate arrays, etc.), and/or software (e.g., program instructions stored in memory such as a RAM, ROM, etc., and/or stored on a storage device such as a magnetic or optical disk, etc., executed on a general purpose processor such as a microprocessor).

§4.3 Exemplary Methods

In the following, §4.3.1 introduces the PHY layer background of a R-DSTC system and summarizes the key advantages that distinguish R-DSTC from a regular DSTC. Then, §4.3.2 describes a crosslayer protocol that facilitates robust cooperative forwarding, and also describes an exemplary rate adaptation that R-DSTC may employ to optimize the throughput performance.

§4.3.1 Exemplary Physical Layer Protocol

This section introduces the basic operation of the R-DSTC scheme at PHY layer. (See, e.g., B. S. Mergen and A. Scaglione, "Randomized Space-Time Coding for Distributed Cooperative Communication," *IEEE Transactions on Signal Processing*, pp. 5003-5017 (October 2007); and B. Sirkeci-Mergen and A. Scaglione, "Randomized Space-Time Coding for Distributed Cooperative Communication," *ICC* (2006), both incorporated herein by reference.) In a generic wireless network, suppose a source station intends to transmit a packet to its destination station. The end-to-end transmission occurs in two hops, via relay stations. In the first hop, the source station broadcasts its packet to its neighbors. Neighbors that successfully decode the source packet are recruited as relay stations. Then, R-DSTC encoded signals from all relays are transmitted simultaneously and decoded by a STC receiver at the destination station, thereby yielding a considerable diversity gain.

In an R-DSTC system, each relay is allowed to have one or multiple antennas to support R-DSTC using a virtual antenna array. For simplicity, in the following description, it is assumed that each station is equipped with a single antenna.

A single-antenna relay employs a regular single-input and single-output (SISO) decoder to decode the information sent by the source station in the first hop. (Recall, e.g., 325 of FIG. 3.) The relay then reencodes the information bits and passes them to a space-time code (STC) encoder. (Recall, e.g., 340 of FIG. 3.) Assume the underlying space-time codeword G is of dimension L×K, where L is the number of antennas and K is the block length transmitted by each antenna. Hence, the output from the STC encoder is in the form of L parallel streams, $X_1, X_2, \ldots, X_L$, each stream corresponding to an antenna. In a standard MIMO system, the $i^{th}$ antenna would transmit stream $X_i$ of K symbols. In contrast, in an R-DSTC system, each relay transmits a linear weighted combination of all L streams. (Recall, e.g., 350 of FIG. 3.) Each weight may be an independently generated random variable with zero mean and variance 1/L. It has been shown in that the complex Gaussian distribution has desirable properties in terms of error rates. (See, e.g. B. S. Mergen and A. Scaglione, "Randomized Space-Time Coding for Distributed Cooperative Communication," *IEEE Transactions on Signal Processing*, pp. 5003-5017 (October 2007); and B. Sirkeci-Mergen and A. Scaglione, "Randomized Space-Time Coding for Distributed Cooperative Communication," *ICC* (2006), both incorporated herein by reference.) Assuming n relays participate in the second hop, then the vector $r_j = [r_{j1} r_{j2} \ldots r_{jL}]$, where j=1, 2, . . . n, represents the random weights at relay j and $R = [r_1, r_2, \ldots, r_n]^T$ is the weight matrix for all these n relays. The receiver at the destination station may be a regular STC receiver with one antenna, and can decode the received signal with a conventional STC decoding implementation.

Thus, although the known R-DTSC physical layer transmission scheme is used for the second hop (e.g., relay node(s) to destination node), in embodiments consistent with the present invention, only those relay nodes that receive the correct packet (e.g., as indicated by a check of the CRC) will forward the information from the source node to the destination node.

§4.3.1.1 R-DSTC Error Rates

This section describes the computation of bit error rate (BER) and PER for the first hop SISO transmissions and for the second hop transmissions, using R-DSTC. These error rates may be used to select appropriate transmission rates to guarantee the packet error rate at the MAC layer. First BER performance for SISO and R-DSTC in an Additive White Gaussian Noise (AWGN) channel is computed for a certain modulation level, M, by assuming all the channel gains are fixed. The packet error rate (PER) for a channel code, C, can then be derived numerically for any given BER. In a fading environment, the average PER is derived by averaging over all fading levels.

To compute BER performance for direct link (SISO), assume that the source transmits with a symbol energy of Es. Then the received signal is:

$$y = \sqrt{E_s} h x + w \quad (1)$$

where y is the received signal, x is the transmitted signal, h is the channel gain and w is complex AWGN with power spectrum density $N_0/2$.

For an M-QAM square constellation, the symbol error rate can be computed as:

$$P_{s,h}(M) = 1 - [1 - P_{\sqrt{M}}]^2 \quad (2)$$

with $$P_{\sqrt{M}} = 2\left(1 - \frac{1}{\sqrt{M}}\right) Q\left(\sqrt{\frac{3E_s \|h\|^2}{(M-1)N_0}}\right) \quad (3)$$

where $$Q(y) = \int_x^\infty \frac{1}{\sqrt{2\pi}} e^{-z^2/2} dz$$

(See, e.g. J. G. Proakis, *Digital Communications* (*Fourth edition*), McGraw Hill, 2000, incorporated herein by reference.)

If the constellation uses Gray coding, the bit error rate for the M-QAM can be approximated by:

$$P_{b,h}^{direct}(M) \approx \frac{1}{\log_2 M} P_{s,h(M)} \quad (4)$$

where the dependence on modulation level M is denoted explicitly.

Note that the instantaneous BER computation for the SISO transmissions can be applied to the first hop of the proposed two hop cooperative R-DSTC transmissions because each relay makes decoding decisions independently. The above can also be used to calculate the performance for both hops of the two-hop transmission for CoopMAC with no receiver combining, which employs only one relay. Here, the BER between AP and node i is defined as $P_{b,i}^{direct}(M) = P_{b,h_i}^{direct}(M)$, and the BER between node pair i and j as $P_{b,ij}^{direct}(M) = P_{b,h_{ij}}^{direct}(M)$.

BER performance for R-DSTC is now described. Suppose there are n relays and the symbol energy at each relay is $E_s$. Consider a space-time code of size L×K, where L is the number of antennas and K is the block length. The underlying space-time code is based on real orthogonal designs. (See, e.g., H. Jafarkhani, *Space-Time Coding: Theory and Practice*, Cambridge University Press (2005) incorporated herein by reference.) For L=2, 4, 8, the orthogonal design provides full rate for a square QAM constellation. (See, e.g., J. G. Proakis, *Digital Communications* (*Fourth edition*), McGraw Hill (2000); and H. Jafarkhani, *Space-Time Coding: Theory and Practice*, Cambridge University Press (2005), both incorporated herein by reference.) Using random weights represented by the vector $r_j$ for relay j, the transmitted signal from the j'th relay at time m, can be expressed as:

$$z_j(m) = \sqrt{E_s} r_j X(m) \quad (5)$$

where j=1, 2, . . . , n and m=1, 2, . . . ,K. Here, X(m) is the $m^{th}$ column of the STC. Assume that each element of $r_j$ is an independent complex Gaussian random variable with zero mean and variance 1/L. (See, e.g., B. S. Mergen and A. Scaglione, "Randomized Space-Time Coding for Distributed Cooperative Communication," *IEEE Transactions on Signal Processing*, pp. 5003-5017 (October 2007), incorporated herein by reference.) The symbols sent by the STC are denoted as $u_l$, where l=1, 2, . . . , L.

The received signal at node i (destination) at the $m^{th}$ symbol interval can be expressed as:

$$y_i(m) = H_i Z(m) + w_i(m) = \sqrt{E_s} H_i R X(m) + w_i(m) \quad (6)$$

where $H_i = [h_{i1} h_{i2} \ldots h_{in}]$ is the 1×n channel vector representing channel gain from each relay to the $i^{th}$ node, w(m) denotes AWGN with power spectrum density $N_0/2$, and $Z(m) = [z_1(m) z_2(m) \ldots z_n(m)]^T$.

Assuming coherent detection and using the orthogonality of the STC, a sufficient statistics to estimate of each symbol, $\hat{u}_l$, can be expressed as:

$$\hat{u}_l = \sqrt{E_s \|H_i R\|^2} u_l + \tilde{w}_l \qquad (7)$$

where $\|.\|$ represents the Frobenius norm and $w_l$ is complex Gaussian noise. (See, e.g., H. Jafarkhani, *Space-Time Coding: Theory and Practice*, Cambridge University Press (2005).) Hence, the impact of R-DSTC transmissions can be modeled as an SISO transmission with an equivalent channel gain of $\|H_i R\|$. Similarly, BER for the second hop R-DSTC transmissions using M-QAM, $P_{b,i}^{R-DSTC}(H_i, M)$ can be computed following steps used in Eq. (2) and Eq. (4).

PER performance in fading channels can be determined as follows. First, employ convolutional coding of rates 1/2, 2/3 and 3/4, using the generator polynomial functions specified in the IEEE 802.11g standard. (See, e.g., IEEE P802.11g, "Further Higher-Speed Physical Layer Extension in the 2.4 GHz Band," *IEEE Standard* (2003).) Assuming the bit errors in the received bit stream, which serves as the input to the channel decoder, are independent and identically distributed (i.i.d.), simulations can be used to derive PER for a given BER for different channel codes. The simulation first generates a bit stream, which is then encoded. The coded bits are flipped randomly according to the BER derived above. The output of the decoder is compared with the original bit stream to calculate the PER. PER(C, $P_b$), where C is the coding rate, may be used to denote the PER performance with BER $P_b$.

In a fading channel, the received signal strength, as well as the PER performance, changes over time. The average PER in a fading channel can be calculated by averaging the PER over all possible fading levels. Thus for any given channel fading statistic to the destination node, the average PER for station i exchange packet with the source directly, using modulation M and rate C coding used for IEEE 802.11g is:

$$P_{e,i}^{direct}(M,C) = \int PER(C, P_{b,h_i}^{direct}(M)) f(h_i) dh_i \qquad (8)$$

where $f(\bullet)$ is the probability density function of the fading. Similarly, the average PER between any pair of stations (i,j) is:

$$P_{e,ij}^{direct}(M,C) = \int PER(C, P_{b,h_{ij}}^{direct}(M)) f(h_{ij}) dh_{ij}. \qquad (9)$$

The average PER for a R-DSTC transmission (second hop, from the relays to the destination), using an STC size of L and using n relays is:

$$P_{e,i}^{R-DSTC}(\{1, 2, \ldots, n\}, M, C, L) = \qquad (10)$$
$$\int \int \ldots \int PER(C, P_{b,i}^{R-DSTC}(H_i, M)) \times$$
$$f(h_{i1}, h_{i2}, \ldots h_{in}) d h_{i1} d h_{i2} \ldots d h_{in} =$$
$$\int \int \ldots \int PER(C, P_{b,i}^{R-DSTC}(H_i, M)) \times f(h_{i1}) f(h_{i2})$$
$$\ldots f(h_{in}) d h_{i1} d h_{i2} \ldots d h_{in}$$

by assuming the fading is independent across nodes. Here, $\{1, 2, \ldots, n\}$ is the index set of n relays, and $f(\bullet)$ is the joint distribution of the channel fading.

§4.3.2 Exemplary MAC Layer Protocol

According to "Part 11: Wireless LAN Medium Access Control (MAC) and Physical Layer (PHY) Specifications," *ANSI/IEEE Std* 802.11, 1999 *Edition*, (1999), the IEEE 802.11 standard specifies two forms of medium access control (MAC): (1) Distributed Coordination Function (DCF); and (2) Point Coordination Function (PCF). For the deployment of WLANs, DCF is mandatory because it is a simple mechanism that enables bandwidth sharing in a fair manner. The DCF scheme is based on a carrier sensing multiple access/collision avoidance (CSMA/CA) algorithm, and is a collision-based channel access mechanism. Before a station transmits its data packets, it senses the channel to ensure it is idle. Meanwhile, virtual carrier sensing is also performed, in order to avoid collisions. This is done by means of Request To Send (RTS) and Clear To Send (CTS) frames. These two control packets set the Network Allocation Vector (NAV), which is used to broadcast channel reservation information to all the stations to avoid the hidden terminal problem.

The exemplary MAC layer protocol (of the R-DSTC based cross-layer framework) described here (1) focuses on the DCF mode, (2) employs RTS/CTS messaging (though this is not strictly necessary), and (3) is fully backward compatible with current IEEE 802.11 standards (though this is not strictly necessary). To translate the PHY layer benefits of R-DSTC to enhance the network performance of a wireless LAN, the exemplary MAC layer protocol may (1) incorporate R-DSTC into the operation of the WLAN DCF mode, and (2) retain RTS/CTS signaling to resolve the hidden terminal problem.

Figure 4:
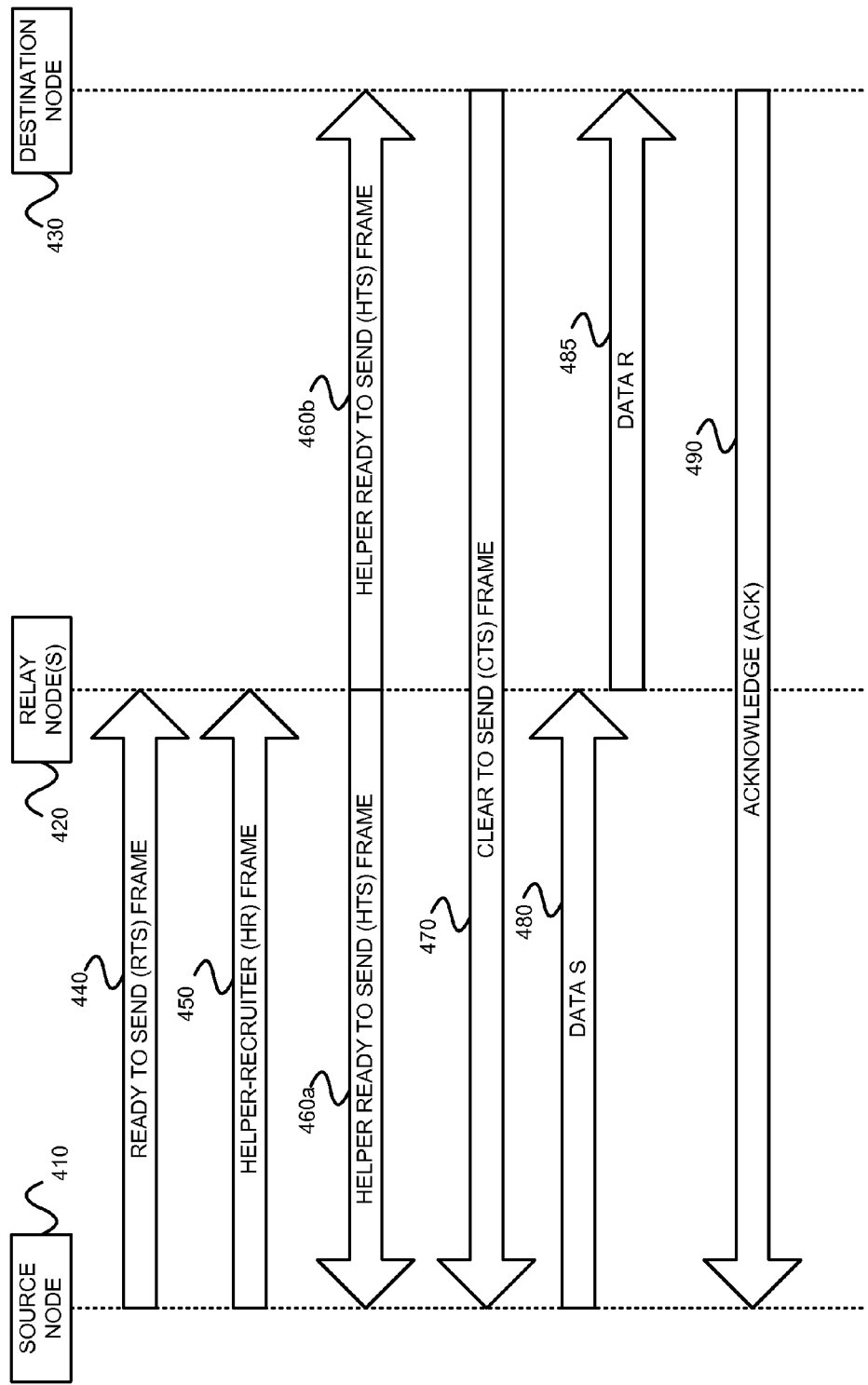
FIG. 4 is a messaging diagram illustrating communications under an exemplary protocol consistent with the present invention.

FIG. 4 is a messaging diagram illustrating communications under an exemplary protocol consistent with the present invention. Before the source node (or station) 410 starts its data transmission, it first transmits a RTS frame (at the base rate) in compliance with the IEEE 802.11 standard. (See 440) The RTS frame reserves the channel for subsequent signaling and data messages. Then the source node 410 sends a Helper-Recruiting (HR) frame (e.g., after a short inter-frame spacing (SIFS) period). (See 450.) This HR frame is transmitted at the chosen first-hop rate $r_1$, which is determined by the modulation level M1 and code rate C1. Only those stations 420 that can support rate $r_1$ from the source 410 can decode the HR frame, and they are further to be able to receive the subsequent data packet. By the use of HR, the relays 420 can be recruited on-the-fly based upon the fluctuations of the fading channel. More specifically, at different fading levels, the set of recruited relays 420 may vary. As long as the instantaneous channel from the source 410 is strong enough, any station in the network can serve as a relay, no matter how far they are from the source 410. The HR frame also contains the underlying STC dimension L and the re-transmission rate $r_2$, which is specified by the modulation level M2 and coding rate C2, for cooperative relaying over the second hop. (Recall, e.g., FIG. 3.) The transmission of the HR frame 450 and the RTS frame 440 may be separated with a SIFS (because these two frames are sent at different rates). In addition, the RTS message 440 is kept unchanged so that our protocol is backward compatible with the current IEEE 802.11 standards.

Any of the relays 420 that successfully decode the HR frame 450 may then send, in unison (at time SIFS after the HR frame is received), a helper-ready to send (HTS) frame. (See 460a,b.) The HTS frame may be sent using R-DSTC at rate $r_2$ and an STC of size L. The HTS frame 460 is initiated for two reasons. First, it is used as an acknowledgement to the source 410 and ensures the source signal is correctly received by some relays at the rate $r_1$. (Note that even if the source node 410 cannot decode the HTS frame at rate $r_2$, it should still be able to perform energy detection of the transmissions of the other nodes, and understand that the relays are forwarding its data.) Second, if the destination node 430 receives the HTS frame correctly, it can verify that the second hop rate $r_2$ is achievable and will reply with a CTS message (See 470) to the source 410 (e.g., after a SIFS period).

The above handshaking procedure reduces potential collisions and packet loss when transmitting a long data packet.

The source 410 then proceeds to send the Data-S frame over the first hop (See 480.). This may be done at the chosen first-hop rate $r_1$, which was determined by the modulation level M1 and code rate C1. The relays 420 then cooperatively transmit the Data-R frame, using R-DSTC, over the second hop. (See 485.) This may be done at rate $r_2$ with STC dimension L. The data (payload) in Data-R matches that in Data-S. Finally, after the destination 430 receives Data-R 485, it transmits an Acknowledgement (ACK) (which is received and decoded by at least the source node 410) if the data packet is successfully decoded. (See 490.) Note that the relay nodes 420 may ignore (e.g., need not decode) the ACK.

Figure 5:
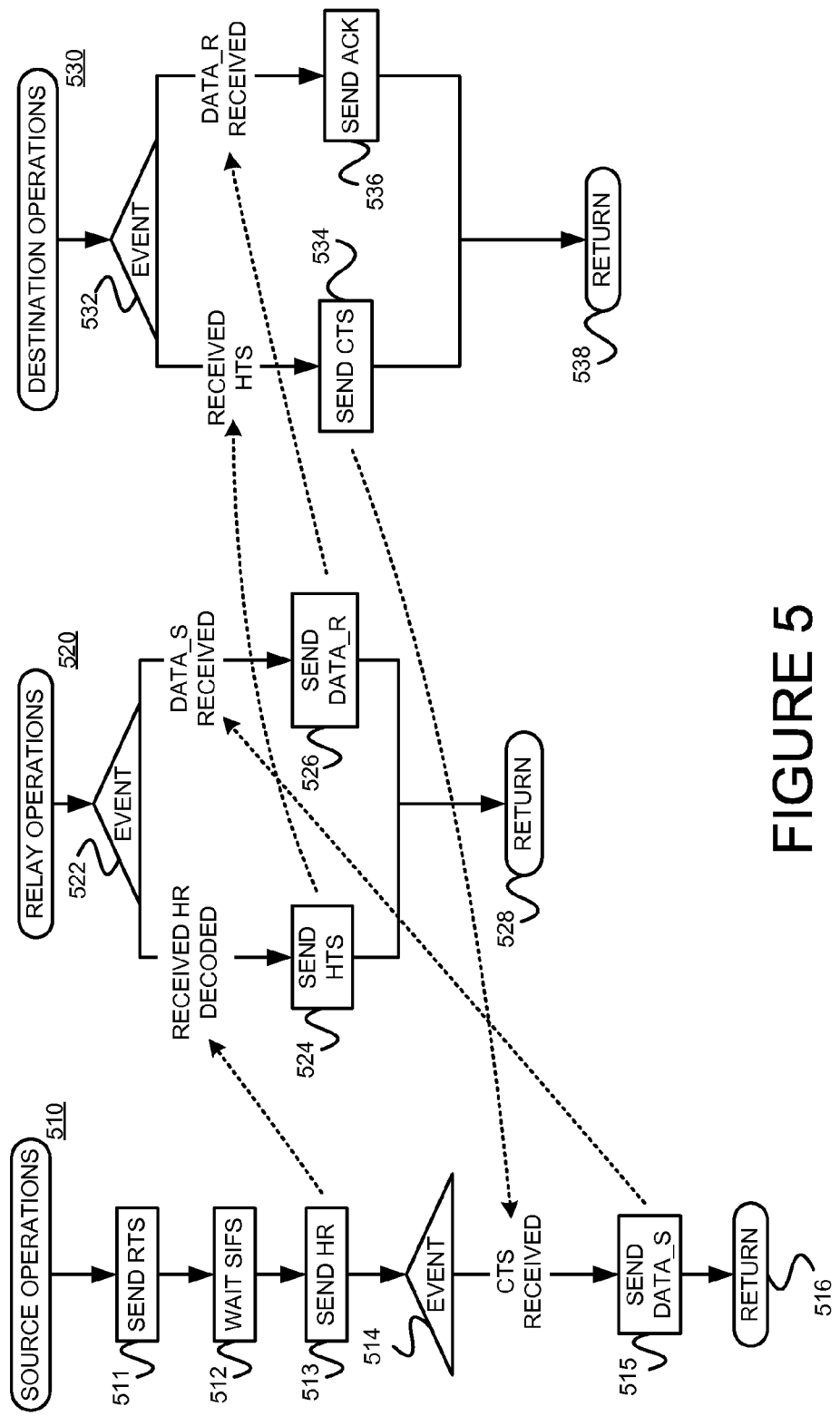
FIG. 5 is a flow diagram of an exemplary MAC layer protocol consistent with the present invention.

FIG. 5 shows flow diagrams of operations 510, 520 and 530 at a source node, relay node(s) and a destination node, respectively, as well as their interactions, in an exemplary MAC layer protocol consistent with the present invention. Source operations 510 transmit a RTS message (at the base rate) in compliance with the IEEE 802.11 standard (Block 511), waits SIFS (Block 512) and then transmits an HR message (at rate $r_1$) (Block 513). Any relay node operations 520 that can decode a received HR frame send an HTS message (at rate $r_2$) before the relay operations 520 are left. (Blocks 522 and 524, and Node 528) In response, the destination operations 530 send a CTS message before the destination operations 530 are left. (Blocks 532 and 534, and Node 538) Responsive to this, the source operations 510 then send Data_S (at rate $r_1$) before the source operations 510 are left. (Blocks 514 and 515, and Node 516) Responsive to receipt of the Data_S, the relay operations 520 send Data_R. (Blocks 522 and 526) Responsive to the receipt of the Data_R, the destination operations 530 send an ACK before the destination operations 530 are left. (Blocks 532 and 536, and Node 538)

§4.3.2.1 Rate Adaptation

In the exemplary protocol(s) described in §4.3.2 above, the values of $r_1$, $r_2$ and L may be jointly optimized by an end-to-end rate adaptation algorithm consistent with the present invention. Such an exemplary rate adaptation algorithm is described in this section.

The source node may collect the node-to-node channel statistics by letting each node send a "hello" packet, which includes its neighbors' average channel signal to noise ratios (SNRs), periodically. The simulation results in §4.5 below show that, if the average channel state information (CSI) on the source-relay(s) link and the relay(s)-destination link are available at the source, the network capacity for R-DSTC based cooperation is much higher over direct transmissions or two-hop single-relay transmissions (CoopMAC). However, R-DSTC based MAC can deliver a comparable throughput gain even if the average CSI is not available at the source station in a R-DSTC system. This advantage reduces or eliminates the need for channel estimation, and therefore greatly reduces the overhead associated with signaling such channel state information.

Most wireless networks use rate adaptation to handle variable received SNR values, so that a satisfactory error probability can be maintained. In at least some exemplary embodiments consistent with the present invention, the criteria for rate adaptation is to keep the PER, before MAC layer retransmissions below a threshold, γ. Typical values for γ are 5% or 10%. If γ is set too high, there are too many retransmissions and packet losses at the MAC layer. On the other hand, if γ is set too low, channel bandwidth is not used efficiently because the communication link could support higher modulation and coding rates.

Assume all stations support the same set of STC's, and the coding rate for the $j^{th}$ STC in the set is $R_{STC,j}$, given that the channel modulation and the channel coding corresponding to the rate $R_i$ the data rate would be $R_i * R_{STC,j}$ for DSTC/R-DSTC cooperative transmissions. (For example, if L=4, there is no full rate STC that achieves full diversity. Rather, the highest rate is 0.75. Therefore, when STC code is used, the transmission rate may need to be reduced. Thus, if the original physical layer rate is 10 Mbps, after L=4 STC is applied, the resulting rate would be 7.5 Mbps.)

In this section, the determination of a desirable (e.g., optimum) two hop data rate and STC size for the downlink is described. Settings for the uplink can be derived in the same way.

Assume there are N mobile stations in the network, each with a PHY layer designed to handle different size QAM constellations and various channel coding rates, resulting in a set of transmission rates $R_0, R_1, \ldots, R_p$, where $R_0$ is the basic rate at which the stations exchange control information, and $R_0 < R_1 < \ldots < R_p$.

Transmission Rate for Direct Transmissions (Legacy Systems)

Under various known IEEE 802.11 cards, if a source (AP) sends the packet to a destination station i directly, without using any relays, the transmission rate should be $$r_i^* = \max r \text{ s.t. } P_{e,i}^{direct}(M_r, C_r) \leq \gamma \tag{11}$$

where $r \in \{R_0, R_1, \ldots, R_P\}$, and $P_{e,i}^{direct}(M_{R_p}, C_{R_p})$ is the PER for direct transmissions using a $M_{R_p}$—QAM modulation and channel coding $C_{R_p}$ derived in Equation (8). Note that $M_{R_p}$ and $C_{R_p}$ define modulation level and code rates used for rate $R_p$.

2. Transmission Rate for Two Hop Transmissions Using One Relay (CoopMAC)

In CoopMAC (See, e.g., P. Liu, Z. Tao, S. Narayanan, T. Korakis, and S. Panwar, "CoopMAC: A Cooperative MAC for Wireless LANs," *IEEE Journal on Sel. Area in Communications*, vol. 25, no. 2, pp. 340-354 (February 2007).), before each transmission, the source picks a dedicated relay for the current packet, as well as the suitable first hop and second hop rate. If node j serves as the relay for transmissions to node i, and $r_1$ and $r_2$ are the first hop and second hop data rates, respectively, the end-to-end PER can be calculated by:

$$P_{e,i}^{coop}(r_1, r_2, j) = 1 - (1 - P_{e,j}^{direct}(M_{r1}, C_{r1})) \times (1 - P_{e,ij}^{direct}(M_{r2}, C_{r2})) \tag{12}$$

where $P_{e,ij}^{direct}$ is given in Equation (9).

The optimum rate pair $r_{i,1}^*, r_{i,2}^*$ and relay selection $j^*$ for CoopMAC is the triplet $$(r_{i,1}^*, r_{i,2}^*, j^*)i = \arg \min_{r_{i,1}, r_{i,2}, j} \frac{1}{r_1} + \frac{1}{r_2} \tag{13}$$

$$\text{s.t. } P_{e,i}^{coop}(r_1, r_2, j) \leq \gamma$$

This optimum rate guarantees the end-to-end PER below MAC layer transmissions error requirement while minimizing channel time used to deliver a packet to the destination in a two hop manner with only one relay.

3. Transmission Rate for R-DSTC

Having introduced the determination of transmission rate(s) for prior systems, rate adaptation procedures consistent with the present invention are now described. The difficulty of the CoopMAC procedure is selecting and recruiting, on the fly, the best one out of the N-1 relays available. An advantage of R-DSTC and the MAC consistent with the present invention is that it avoids this difficulty, while at the same time providing increased link resilience and rate gains through the recruitment of multiple cooperative stations simultaneously. In a system consistent with the present invention, rate adaptation only needs to determine the rates for both hops (source to the relay, and relay to destination), and the STC to use for the second hop. Since the PER performance depends on the actual set of relays participating in the forwarding, the performance of using all possible sets of relays may be examined to derive the end-to-end packet error performance.

There is a dependence between the first hop rate $r_1$ and the second hop rate $r_2$ that produces a tradeoff More specifically, the higher the data rate $r_1$ for the first hop transmission, the less time is consumed for the first hop. However, this means that fewer relays can decode the source information and participate in the second hop, which decreases the supported data rate $r_2$ for the second hop. On the other hand, the lower the data rate $r_1$ for the first hop transmission, the more time is consumed for the first hop. However, this means that more relays can decode the source information and participate in the second hop, which increases the supported data rate $r_2$ for the second hop.

Another task for the proposed MAC is to choose a suitable STC to be used by the relays. The diversity gain is limited by the minimum of the STC dimension L and number of relays n. If L is too small, the diversity gain is limited. Therefore, a MAC protocol consistent with the present invention should pick an L that is large enough, while at the same time guaranteeing that there are at least L relays for most of the time. Also, in practice, good space-time codes only exist for particular values of L.

For the set of all mobile stations $S=\{1, 2, \ldots, N\}$, the power set of S, denoted by $\mathcal{P}(S)$, is the set of all subsets of S.

The relay set for node i, whose elements are all the possible sets of relays assisting transmission to node i, is denoted by:

$$\mathcal{R}_{S_i} = \mathcal{P}(S) \setminus \bigcup_{A \in \mathcal{P}(S) \text{ and } i \in A} A \quad (14)$$

where \ denotes the relative complement. Since there are N-1 possible relay stations, the relay set $\mathcal{R}_{S_i}$ contains 2N-1 elements, each corresponding to a possible scenario for the actual relays. The empty set Ø, is also an element in the relay set, representing a scenario in which none of the potential relays receive information correctly from the source. (Assume the corresponding packet error rate for the empty set is 1.)

For any $T \in \mathcal{R}_{S_i}$, define the average probability that all nodes in T receive the packet from the source, and all nodes not in T fail to receive the packet from the source, by:

$$p_i(T) = \prod_{\text{all } j \in T} (1 - P_{e,j}^{direct}(M_{r1}, C_{r1})) \times \prod_{\text{all } k \notin T} P_{e,k}^{direct}(M_{r1}, C_{r1}). \quad (15)$$

The second hop $P_{e,i}^{R-DSTC}$ (T,$r_1$,$r_2$,L), using a fixed set of relays T, can be calculated using Equation (10).

Assuming all links fade independently, the overall end-to-end average PER, considering all possible relaying scenarios, can be expressed by:

$$P_{e,i}^{R-DSTC,2hop}(r_1, r_2, L) = \sum_{\text{all } T \in RS_i} (p_i(T) \times P_{e,i}^{R-DSTC}(T, M_{r2}, C_{r2}, L)) \quad (16)$$

The transmission scheme that maximizes the throughput while maintaining the packet loss rate threshold for transmissions to destination node i (i.e., the triplet ($r_1^*, r_2^*, L^*$)) can be found by solving the following minimization problem:

$$(r_1^*, r_2^*, L^*)i = \arg\min_{r_1, r_2, L} \frac{1}{r_1} + \frac{1}{r_2} \quad (17)$$

$$\text{s.t. } P_{e,i}^{R-DSTC,2hop}(r_1, r_2, L) \leq \gamma$$

Note that Equations (16) and (17) only depend on the average channel statistics regarding all inter-user link qualities. Alternatively, the error rate in Equation (16) can be averaged over all user locations and further used in Eq. (17), leading to an optimal choice of (r1, r2, L) only based on number of users N in the network.

FIG. 10 illustrates pseudo code for two rate adaptation techniques—STiCMAC Channel Statistics and STiCMAC User Count—consistent with the present invention.

§4.3.3 Alternatives, Refinements and Extensions

The RTS, CTS and ACK messages described above may be compliant with IEEE 802.11, though this is not strictly necessary. Further, although these messages are useful in environments and scenarios in which collisions are more likely, they are not mandatory.

Although the HR message described above may include information specifying the modulation to be used in the second hop (i.e., relay nodes to destination node), which type of coding to use for the second hop, and/or STC index (to specify which of a plurality of previously specified space time coding to use in the second hop), even an HR message is not strictly necessary. For example, some or all of this information may be included in the header of a first hop data packet instead.

Although the HTS message was shown as being received by the source node, this is not necessary.

Although SIFS interval was used to separate various messages, some other interval may be used instead, or in addition.

Although the source, relay and destination devices may be described as "stations", embodiments consistent with the present invention can work with any type of wireless node, whether stationary or mobile.

§4.4 Illustrative Example of Operations

An example illustrating operations of an exemplary protocol consistent with the present invention is now described with reference to FIGS. 6 and 7. As shown in FIG. 6, this example uses four potential relays. In this example, assume the packet is received by relays 1, 2 and 4 from the source, which forward the packet at the next time slot. However, assume that relay 3 fails to receive the packet correctly and does not participate in forwarding the packet to the destination. (That is, assume that relays 1, 2 and 4 receive and properly decode the packet at rate $r_1$, but that relay 3 does not.) The set of relays that actually receive from the source could vary from packet to packet.

Referring now to FIG. 7, before the source starts its data transmission, it first transmits an RTS frame 740 at the base rate in compliance with the IEEE 802.11 standard. (Recall 440 of FIG. 4.) The RTS frame 740 reserves the channel for subsequent signaling and data messages. Then, after a SIFS period, the source sends an HR frame 750. (Recall 450 of FIG. 4.) This HR frame 750 is transmitted at the chosen first-hop rate $r_1$, determined by the modulation level M1 and code rate C1. (Recall section 4.3.2.1 above.)

Only those nodes that can support rate $r_1$ (in this example, relays 1, 2 and 4) from the source can decode the HR frame 750, and it is assumed that they will be able to receive the subsequent data packet. Using HR 750, the relays can be recruited on-the-fly based upon the fluctuations of the fading channel. More specifically, at different fading levels, the set of recruited relays may vary. As long as the instantaneous channel from the source is strong enough, any station in the network can serve as a relay, no matter how far they are from the source. The HR frame 750 may also contain the underlying STC dimension L and the transmission rate $r_2$, which is specified by the modulation level M2 and coding rate C2 (Recall section 4.3.2.1. above.), for cooperative relaying over the second hop.

Note that the transmission of HR 750 and RTS 740 are separated by time SIFS because these two frames are sent at different rates. In addition, the RTS message 740 may be kept unchanged so protocols consistent with the present invention may be backward compatible with the current IEEE 802.11 standards.

When the relays (1, 2 and 4, but not 3) successfully decode the HR frame 750, they send, in unison (e.g., SIFS time after the HR frame is received), the HTS frame 760, using R-DSTC with rate $r_2$ and an STC of size L. (Recall 460*a,b* of FIG. 4.) Recall that the HTS frame 760 is initiated for use as an acknowledgement to the source (to ensure that the source signal is correctly received by some relays at the rate $r_1$.) Further, the destination station, as long as it receives the HTS frame 760 correctly, can verify that the second hop rate $r_2$ is achievable and will reply with a CTS 770 message to the source (e.g., after a SIFS period). (Recall 470 of FIG. 4.)

The above handshaking procedure reduces the potential collisions and packet loss when transmitting a long data packet.

The source then proceeds with sending the Data-S frame 780 over the first hop at rate $r_1$, and the relays cooperatively transmit the Data-R frame 785 using R-DSTC over the second hop at rate $r_2$ with STC dimension L. (Recall 480 and 485 of FIG. 4.) Finally, the destination station receives Data-R 785 and sends back an Acknowledgement (ACK) 790 if the data packet is successfully decoded. (Recall 490 of FIG. 4.)

In FIG. 7, the RTS, CTS and ACK are sent at a given rate (for example, in a manner so as to be compatible with a version IEEE 802.11), as indicated by the hatch-free blocks. Messages HR and DATA_S are sent at the rate $r_1$ as indicated by cross-hatched blocks, while messages HTS and DATA_R are sent at the rate $r_2$ as indicated by hatched blocks.

§4.5 Simulation-Based Performance Evaluation

The performance of the proposed space time coding for cooperative MAC (STiCMAC) scheme was simulated using OPNET modeler. Under the simulation STiCMAC with direct transmission, CoopMAC as defined in the article, P. Liu, Z. Tao, S. Narayanan, T. Korakis, and S. Panwar, "Coop-MAC: A Cooperative MAC for Wireless LANs," *IEEE Journal on Sel. Area in Communications*, Vol. 25, No. 2, pp. 340-354 (February 2007) and the DSTC MAC layer protocol as defined in the article G. Jakllari, S. V. Krishnamurthy, M. Faloutsos, P. V. Krishnamurthy, and O. Ercetin, "A Framework for Distributed Spatio-Temporal Communications in Mobile Ad hoc Networks," *Proc., IEEE INFOCOM* (Barcelona, Spain, April 2006). Additionally, all schemes use the rate adaptation algorithm described in §4.3.2.1 above. The comparison and evaluation was done on a typical single-cell WLAN. Simulations were conducted and evaluated for both stationary and mobile environments.

Network Topology and Configuration

In the simulation, it was assumed that the considered wireless LAN complies with the IEEE 802.11g standard and its cell radius is set to 100 meters, which is a typical WLAN coverage range in an indoor environment. The wireless LAN is operated on a 2.4GHz frequency carrier with a spectrum bandwidth of 20MHz. An AWGN channel with independent Rayleigh slow fading among each pair of stations is adopted as the channel model. The simulated system consists of one access point (AP) at the center of a cell and N mobile stations. According to H. Jafarkhani, *Space-Time Coding: Theory and Practice* (Cambridge University Press, 2005), both for DSTC and R-DSTC, a full-rate orthogonal STC is employed for L=2 with $R_c$=1, while a $R_c$=3/4 rate orthogonal STC is employed for L=3, 4. Each AP or mobile station is equipped with a single omnidirectional antenna. The simulations were conducted on the uplink from the mobile stations to the AP, with the parameters shown in Table II of FIG. 9. The simulation results display 90% confidence intervals.

B. Mobility Model

The simulation was performed for both stationary and mobile scenarios. In the stationary scenario, all stations are uniformly distributed within the cell coverage, while in the mobile scenario, the stations are assumed to move across the cell using the random walk with reflection (RWkRlc) model. (See, e.g., M. McGuire, "Stationary Distributions of Random Walk Mobility Models for Wireless Ad Hoc Networks," *Proc., ACM International Symposium on Mobile Ad hoc Networking and Computing* (Urbana-Champaign, IL, May 2005).) The RWkRlc model is widely adopted in the literature to characterize the movement of mobile stations. The RWkRlc model initially deploys stations randomly according to a uniform distribution over the cell. Then, it assigns a random speed to each station that is uniformly distributed in the range [$V_{min}$, $V_{max}$]. Each station picks a random travel duration uniformly distributed in the range [$T_{min}$, $T_{max}$] and random direction using a uniform distribution to walk towards. Once a station has walked for the selected duration of time, it may dwell for a random amount of time $T_d$ based upon a uniform distribution before it reselects a new travel duration, speed and direction. As described above, all stations move in a similar fashion within that cell. In contrast to the classic Random Walk model (See, e.g., T. Camp, J. Boleng, and V. Davies, "A Survey of Mobility Models for Ad Hoc Network Research," *Wireless Communications and Mobile Computing*, Vol. 2, No. 5, pp. 483-502 (2002).), the RWkRlc-governed model includes reflection as an additional feature. Namely, whenever a station reaches the cell boundary during its walk, it will be reflected by the boundary in a similar way that a ray of light reflects off a mirror. This reflection functionality will ensure that the random walk is bounded within a given cell coverage. Accordingly, the RWkRlc model produces a uniform spatial distribution of all stations across the cell and thus enables us to make a fair comparison with the static scenario. In a mobile environment, the channel estimation interval is assumed to be 2 seconds. The typical parameters of the RWkRlc model we used are shown in Table II of FIG. 9.

C. Simulation Results

Figure 11:
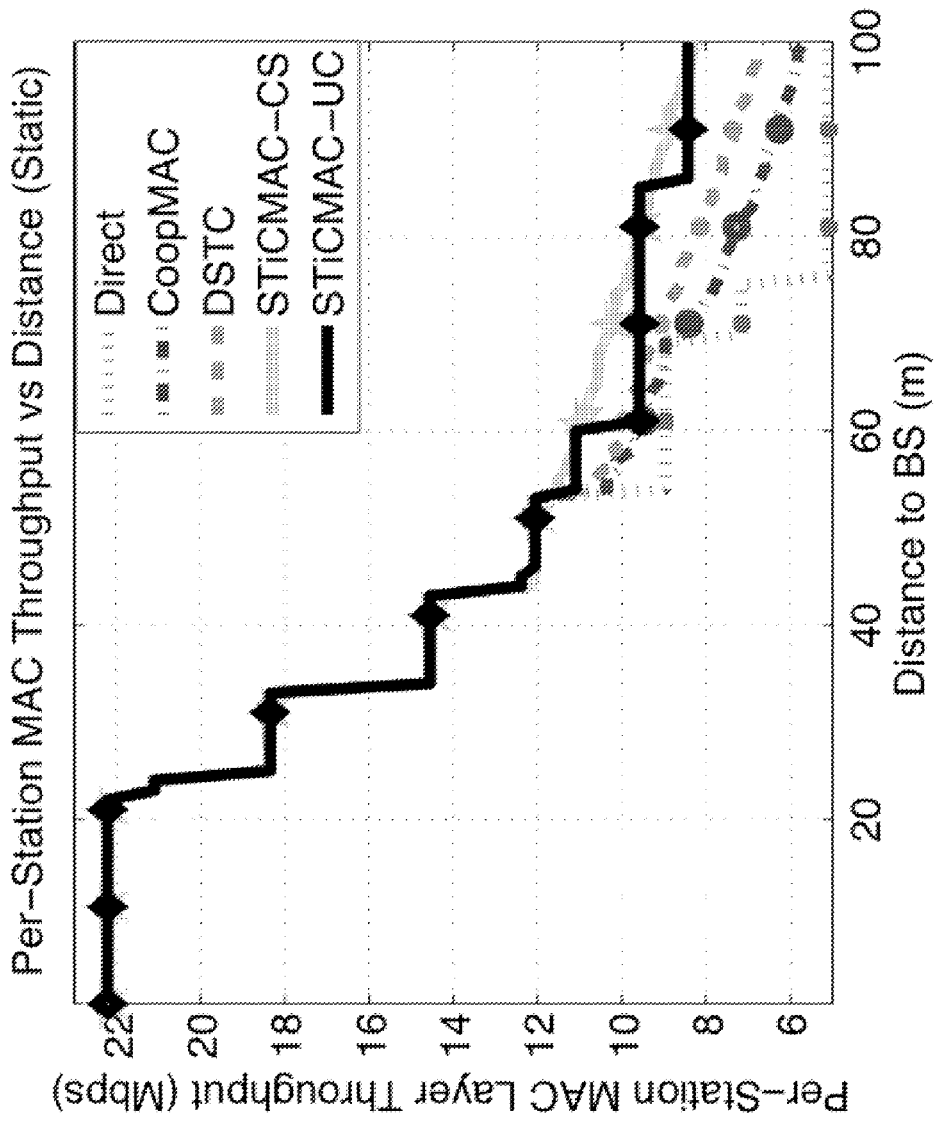
FIG. 11 illustrates per-node MAC throughput versus distance.

FIG. 11 depicts the MAC layer throughput performance of a single station as a function of its distance to the AP, assuming N=48 stations are uniformly distributed in a static wireless LAN. When the distance is close to the AP, all schemes fall back to direct transmission and thus achieve the same throughput performance. As the distance to the AP grows, all the two-hop schemes outperform direct transmission because two high-speed hops provide a higher end-to-end throughput than a low-speed direct transmission, especially as the stations get closer to the cell edge. For large distances, STiC-MAC with channel statistics (STiCMAC-CS) and STiCMAC with user count (STiCMAC-UC) schemes show the highest per-station throughput gains, followed by the DSTC and CoopMAC methods.

Figure 12:
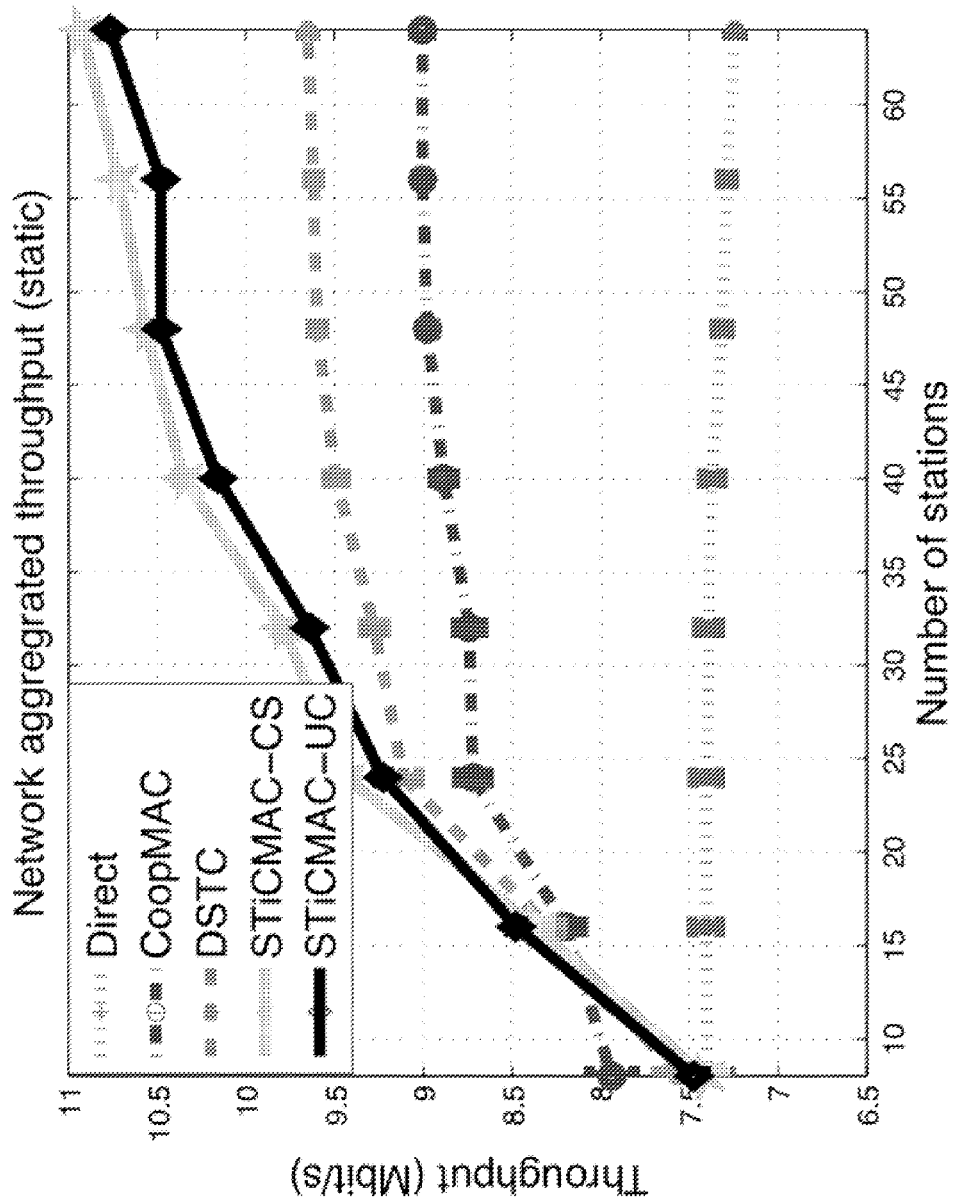
FIGS. 12 and 13 illustrate network aggregated throughput performance of a WLAN cell in the simulation in a system with static nodes and mobile nodes, respectively.

FIG. 12 displays the comparison of the aggregate throughput in a stationary environment as a function of N, the number of stations. When the number of stations is less than 16, the two STiCMAC schemes, STiCMAC-CS and STiCMAC-UC, provide throughput performance comparable to CoopMAC and DSTC, while all the cooperative schemes provide a higher throughput than direct transmission. Note that for a small number of stations, DSTC performs worse than the other two-hop schemes, due to the increased overhead for relay recruitment. Compared to CoopMAC, the extra overhead needed by DSTC includes the pilot tones (1 time slot for each pilot which is 9 µseconds) and relay indexes (1 byte for each relay) sent by the source to the selected relays, as well as the acknowledgements (1 time slot which is 9 µseconds for each relay) from all these relays before every packet transmission is initiated, as is described in the article G. Jakllari, S. V. Krishnamurthy, M. Faloutsos, P. V. Krishnamurthy, and O. Ercetin, "A Framework for Distributed Spatio-Temporal Communications in Mobile Ad hoc Networks," *Proc., IEEE INFOCOM* (Barcelona, Spain, April 2006).

The more relays recruited by DSTC, the higher the overhead. As the number of stations increases, STiCMAC shows a significant throughput gain over the other schemes because (1) a large number of stations lead to a higher probability of finding more relays (which leads to an enhanced diversity and power gain over the second hop), and (2) compared to the DSTC MAC (See, e.g., G. Jakllari, S. V. Krishnamurthy, M. Faloutsos, P. V. Krishnamurthy, and O. Ercetin, "A Framework for Distributed Spatio-Temporal Communications in Mobile Ad hoc Networks," *Proc., IEEE INFOCOM* (Barcelona, Spain, April 2006).), STiCMAC needs substantially reduced signaling overhead and handshaking Additionally, the overhead of STiCMAC is constant and independent of the number of relays, while the DSTC overhead increases as the number of relays increases. Note that the throughput gain of STiCMAC over direct transmission is up to 50%. Also note that the aggregate throughput of STiCMAC-UC is only slightly lower than STiCMAC-CS. This is because a sufficiently large number of stations supplies sufficient potential relays and thus eliminates the need for a global knowledge of node locations. This is a significant result and demonstrates that STiCMAC operates efficiently without a global knowledge of channel statistics.

Figure 13:
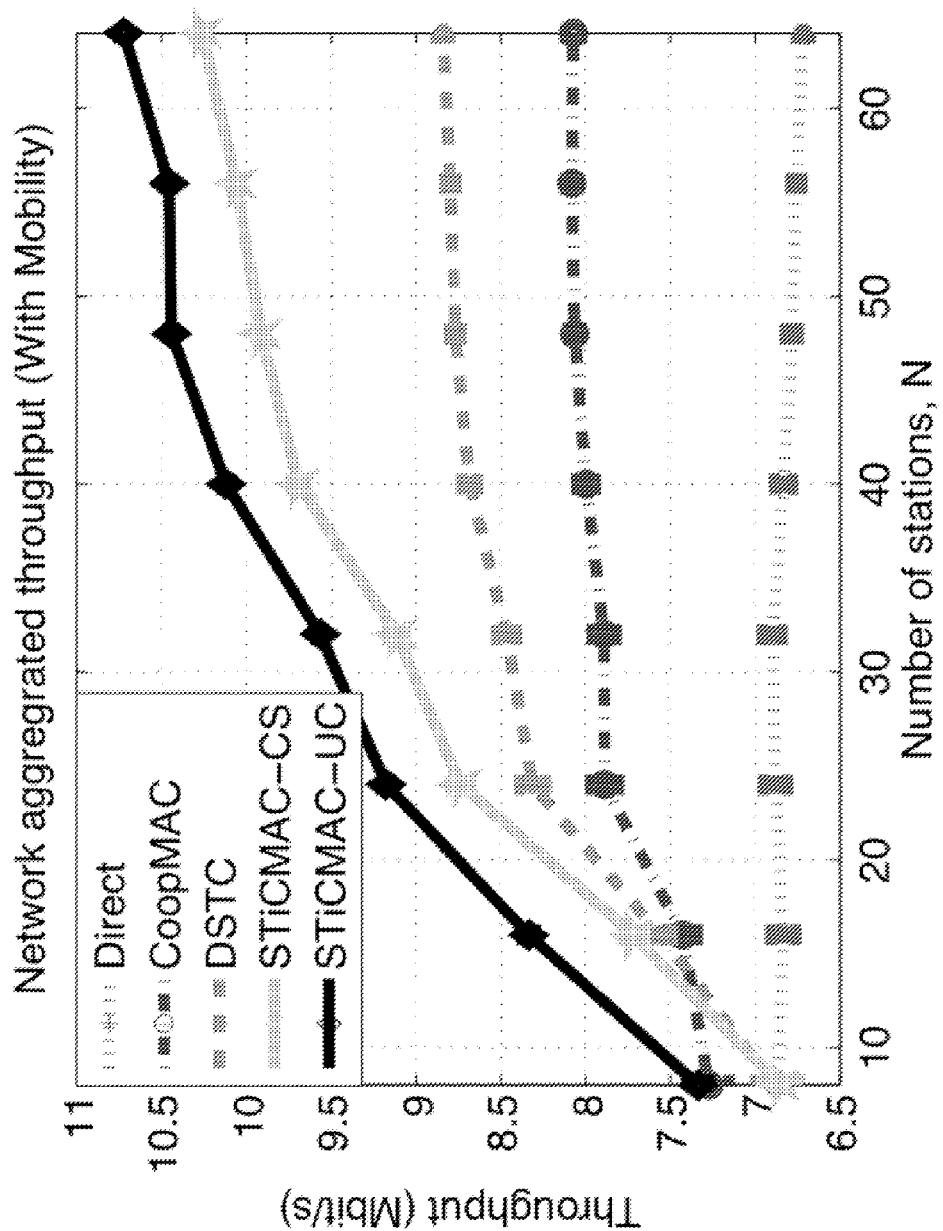

FIG. 13 depicts the throughput performance of all schemes in a mobile environment where each station moves according to the RWkRlc model. Under mobility, assume each source station can only perform rate adaptation with channel statistics updated every 2 seconds. In contrast to the stationary scenario, the throughput of all schemes except STiCMAC-UC degrade relative to the static case as mobility leads to an inaccurate estimation of channel information, resulting in sub-optimal rate adaptation. For example, in CoopMAC and DSTC, the selected relay stations may move away due to mobility and become unavailable in the forwarding phase. From FIG. 13, it is clear that STiCMAC schemes outperform the other schemes in terms of throughput. Under mobility, STiCMAC-UC performance is superior to that of STiCMAC-CS. Therefore in a mobile environment, STiCMAC-UC scheme is preferable since it does not rely on the instantaneous spatial distribution of all stations for rate adaptation, and thus leads to more robust throughput performance.

Figure 14:
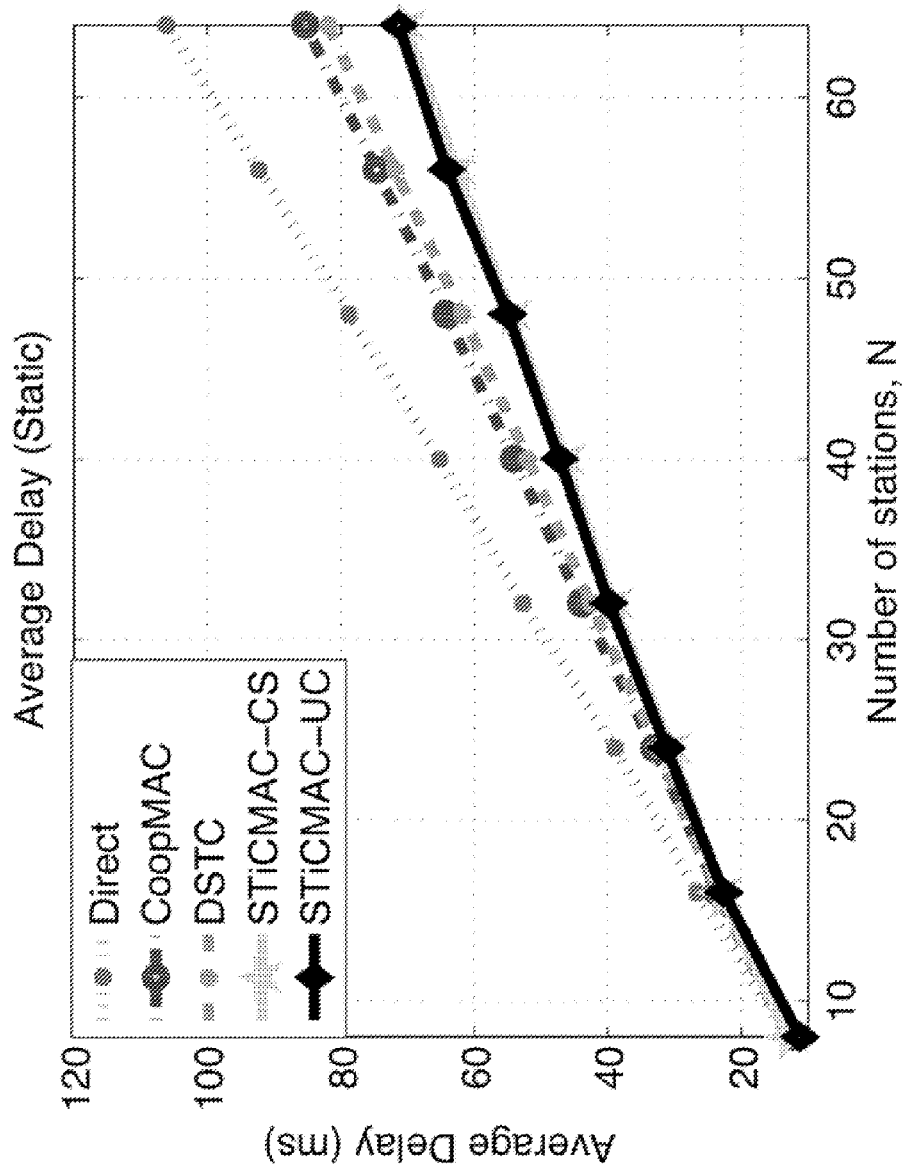
FIGS. 14 and 15 illustrate the average service delay in a WLAN cell in the simulation in a system with static nodes and mobile nodes, respectively.
Figure 15:
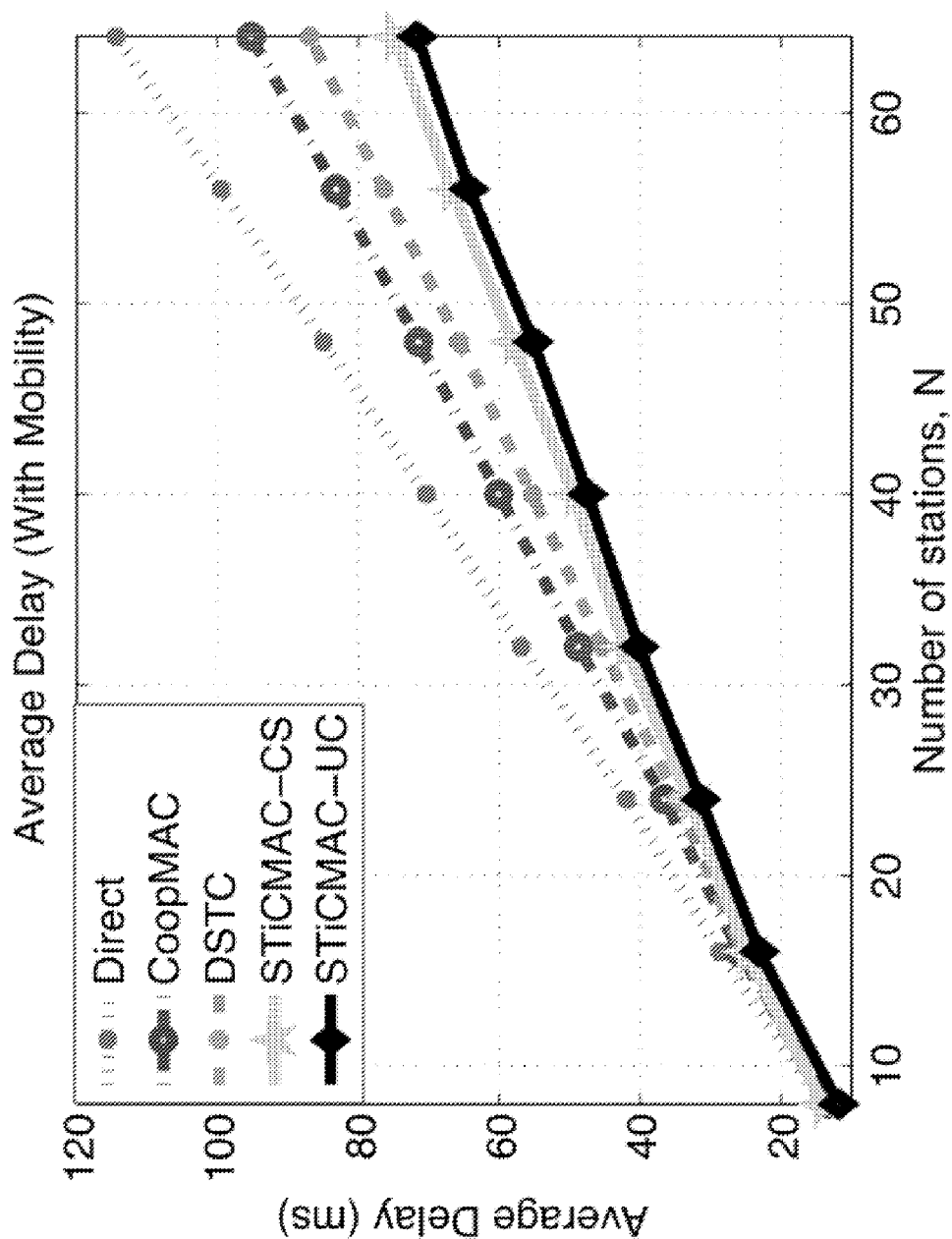

FIGS. 14 and 15 demonstrate the medium access delay for a stationary and mobile environment respectively under full load. This delay is measured from the moment that a packet becomes the head-of-line packet in the MAC transmission buffer, to the moment that packet is successfully received at the MAC layer of the receiver. FIGS. 14 and 15 reveal that a large number of stations cause an increase in medium access delay for all schemes due to the increased delay before successful access to the channel. However, STiCMAC achieves the lowest delay compared to direct transmission, CoopMAC and the DSTC, since R-DSTC supports a higher end-to-end rate for each connection, and therefore decreases the end-to-end transmission time.

Figure 16:
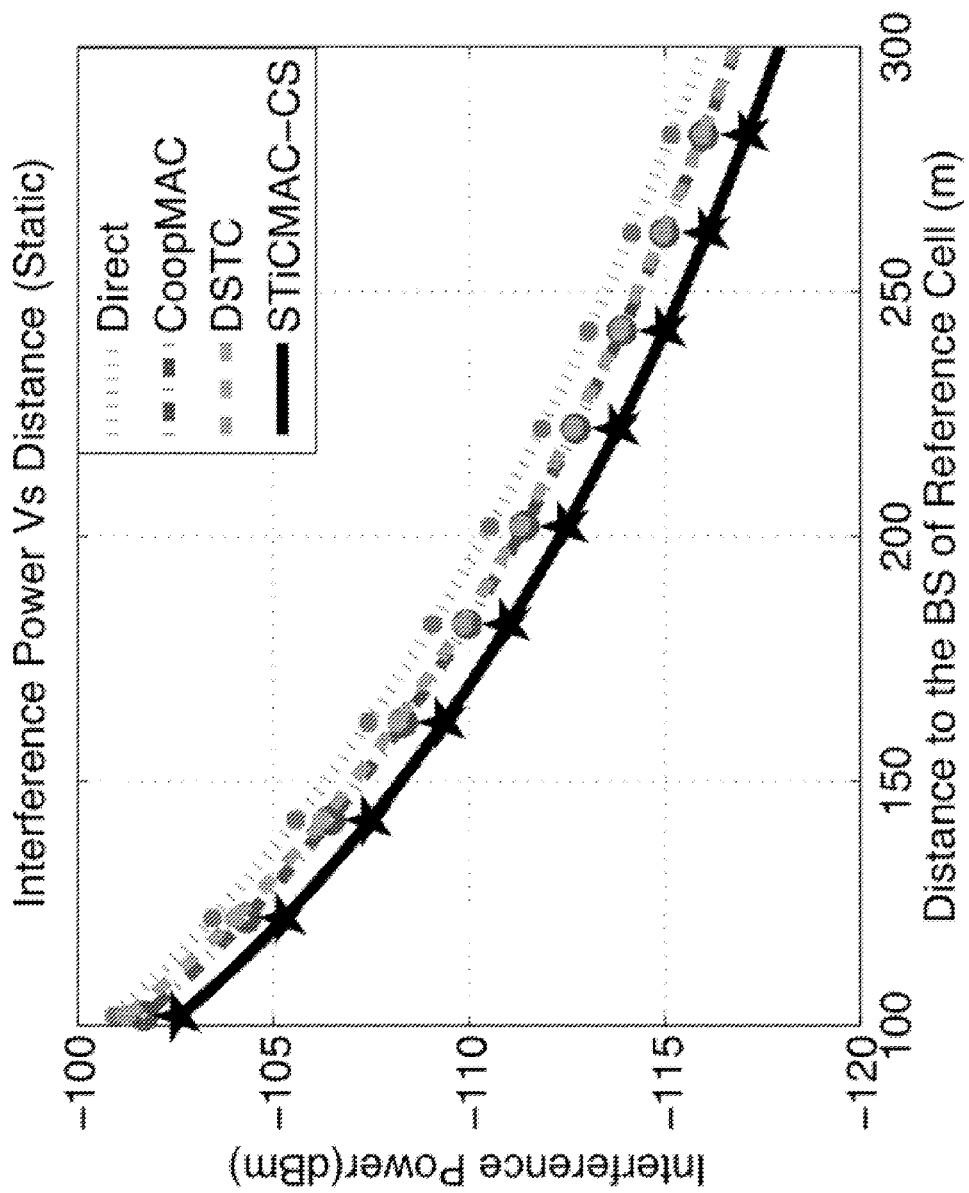
FIG. 16 illustrates simulated interference power versus distance in a system with static nodes.

In addition to throughput and delay performance, STiCMAC also reduces the interference generated to neighboring cells when loaded with traffic at the same level. This aspect of STiCMAC was illustrated by simulating the interference generated by STiCMAC-CS. This is because STiCMAC supports a higher average data rate per packet transmission and thus needs reduced air time to deliver the same amount of data on an end-to-end basis, as compared to the other schemes. Consequently, the average transmission power emanating from the reference cell is reduced, even though more relays have been recruited. FIG. 16 shows the interference in a mobile scenario where the average interference power generated by a cell is calculated assuming N=24 users in each cell. The average interference power is illustrated in FIG. 16 and measured in units of dBm at a distance of (100-300 m) away from the AP of the reference cell. Notice that both STiCMAC schemes generate less interference compared to DSTC, CoopMAC and direct transmission.

In conclusion, STiCMAC generates less interference at the same MAC layer traffic load compared to the other schemes.

An important result illustrated FIGS. 11-15 is that the R-DSTC User Count scheme achieves throughput and delay performance comparable to that of the R-DSTC Channel Statistics scheme, even for a moderate number of stations. These results suggest that R-DSTC can be implemented in a WLAN system without the need to collect the station-to-station channel statistics, considerably reducing the required measurement overhead.

§4.6 Conclusions

The foregoing describes exemplary distributed and opportunistic medium access control (MAC) layer protocol for randomized distributed space-time coding (R-DSTC), which may be deployed in an IEEE 802.11 wireless local area network (WLAN). Unlike other cooperative MAC designs, there is no need to predetermine, before packet transmission, which stations will serve as relays. Instead, the MAC layer protocol opportunistically recruits relay stations on the fly. Network capacity and delay performance is much better than legacy IEEE 802.11g network, and even cooperative forwarding using one relay station. Avoiding the need to collect the station-to-station channel statistics considerably reduces overhead otherwise required for channel measurement and signaling.

What is claimed is:

1. For use in a wireless network, a processor-implemented method for facilitating the cooperative communication of data from a source node to a destination node via a plurality of relay nodes, the processor-implemented method comprising:
   a) transmitting, with the source node, a ready to send message;
   b) transmitting, with the source node, a helper recruiter message;
   c) responsive to a receipt and successful decoding of the helper recruiter message by at least some of the plurality of relay nodes, transmitting, with at least some of the plurality of relay nodes, a helper ready to send message;
   d) responsive to the receipt and successful decoding of the helper ready to send message, transmitting, with the destination node, a clear to send message;
   e) responsive to the receipt and successful decoding of the clear to send message, transmitting, with the source node, data for receipt by the at least some of plurality of relay nodes;

f) responsive to the receipt of the data by the at least some of the plurality of relay nodes, retransmitting, with at least some of the plurality of relay nodes, the data for receipt by the destination node, wherein the helper recruiter message is a separate message from the ready to send message and is transmitted after the ready to send message is transmitted.

2. The processor-implemented method of claim 1 wherein the ready to send message is compliant with IEEE 802.11.

3. The processor-implemented method of claim 1 wherein the clear to send message is compliant with IEEE 802.11.

4. The processor-implemented method of claim 1 wherein the helper recruiter message includes a MAC address of the source node and a MAC address of the destination node.

5. The processor-implemented method of claim 1 wherein the helper recruiter message includes parameters to be used for the retransmission of data from the at least some of the plurality of relay nodes to the destination node.

6. The processor-implemented method of claim 1 wherein the helper recruiter message and the data transmissions by the source node occur at a first hop rate.

7. The processor-implemented method of claim 6 wherein the helper to send message and the data retransmissions by the at least some of the plurality of relay nodes occur at a second hop rate.

8. For use in a wireless network, a processor-implemented method for facilitating the cooperative communication of data from a source node to a destination node via a plurality of relay nodes, the processor-implemented method comprising:
 a) receiving, with a relay node, a ready to send message transmitted from the source node;
 b) receiving, with the relay node, a helper recruiter message transmitted from the source node;
 c) responsive to a receipt and successful decoding of the helper recruiter message by the relay node, transmitting, with the relay node, a helper ready to send message;
 d) receiving, with the relay node, data transmitted by the source node; and
 e) retransmitting, responsive to the receipt of the data with the relay node, the data for receipt by the destination node,
 wherein the helper recruiter message is a separate message from the ready to send message and is received after the ready to send message is received.

9. The processor-implemented method of claim 8 wherein the helper recruiter message includes a MAC address of the source node and a MAC address of the destination node.

10. The processor-implemented method of claim 8 wherein the helper recruiter message includes parameters to be used for the retransmission of data from the at least some of the plurality of relay nodes to the destination node.

11. The processor-implemented method of claim 8 wherein the helper recruiter message and the data transmissions by the source node occur at a first hop rate.

12. The processor-implemented method of claim 11 wherein the helper to send message and the data retransmissions by the at least some of the plurality of relay nodes occur at a second hop rate.

13. A system comprising:
 a) a source node including
  1) a transmitter,
  2) a receiver, and
  3) a controller, wherein the controller
   A) causes the transmitter to transmit a ready to send message, and a helper recruiter message, wherein the helper recruiter message is a separate message from the ready to send message and is transmitted after the ready to send message is transmitted, and
   B) responsive to a receipt of a clear to send message by the receiver, causes the transmitter to transmit data for receipt by the at least some of the plurality of relay nodes;
 b) a plurality of relay nodes, each including
  1) a transmitter,
  2) a receiver, and
  3) a controller, wherein the controller of each of the relay nodes
   A) responsive to the receipt of the helper recruiter message by its receiver and successful decoding of the received helper recruiter message by its decoder, causes its transmitter to transmit a helper ready to send message, and
   B) responsive to the receipt of the data by its receiver, causes its transmitter to retransmit the data; and
 c) a destination node including
  1) a transmitter,
  2) a receiver, and
  3) a controller, wherein the controller of the destination node, responsive to the receipt the helper ready to send message by its receiver, causes its transmitter to transmit a clear to send message.

14. The system of claim 13 wherein the ready to send message is compliant with IEEE 802.11.

15. The system of claim 13 wherein the clear to send message is compliant with IEEE 802.11.

16. The system of claim 13 wherein the helper recruiter message includes a MAC address of the source node and a MAC address of the destination node.

17. The system of claim 13 wherein the helper recruiter message includes parameters to be used for the retransmission of data from the at least some of the plurality of relay nodes to the destination node.

18. The system of claim 13 wherein the helper recruiter message and the data transmissions by the source node occur at a first hop rate.

19. The system of claim 18 wherein the helper to send message and the data retransmissions of relay nodes occur at a second hop rate.

* * * * *